(12) United States Patent
Young et al.

(10) Patent No.: US 7,274,684 B2
(45) Date of Patent: Sep. 25, 2007

(54) METHOD AND SYSTEM FOR IMPLEMENTING AND MANAGING A MULTIMEDIA ACCESS NETWORK DEVICE

(76) Inventors: Bruce Fitzgerald Young, 1258 Silverado Dr., San Jose, CA (US) 95120; Noel Gerard Allen, 2207 Santa Cruz Ave., Santa Clara, CA (US) 95051; David Mitchell Hurwit, 436 Mountain Laurel Ct., Mountain View, CA (US) 94043

(*) Notice: Subject to any disclaimer, the term of this patent is extended or adjusted under 35 U.S.C. 154(b) by 952 days.

(21) Appl. No.: 10/268,024

(22) Filed: Oct. 9, 2002

(65) Prior Publication Data

US 2003/0093563 A1 May 15, 2003

Related U.S. Application Data

(60) Provisional application No. 60/328,217, filed on Oct. 10, 2001.

(51) Int. Cl.
*H04L 12/66* (2006.01)
*H04L 12/28* (2006.01)
(52) U.S. Cl. .................. 370/352; 370/401; 379/900
(58) Field of Classification Search ............. 370/229, 370/352, 356, 389, 392, 401; 709/229, 245
See application file for complete search history.

(56) References Cited

U.S. PATENT DOCUMENTS 6,687,245 B2 * 2/2004 Fangman et al. ............ 370/356

(Continued)

OTHER PUBLICATIONS

Arango, M., et al. Media Gateway Control Protocol (MGCP) Version 1.0. Request for Comments: 2705. 1999. pp. 63-64.*

*Primary Examiner*—Hassan Kizou
*Assistant Examiner*—Betty Lee
(74) *Attorney, Agent, or Firm*—Lumen Intellectual Property Services, Inc.

(57) ABSTRACT

In a complete network-in-a-box system acting as an enterprise network demarcation point, packets such as voice, video and data packets, are routed over common network connections, such as LAN and WAN. The packets are mapped from a public address field (such as an IP address) and port number to a private address field and port number, the mapping process typically being handled by a NAT (Network Address Translation). The packets are also prioritized, by marking the packets for priority queuing and routing, and configuring the bandwidths of the WAN traffic and the voice traffic to predetermined quantities and configuring the address fields of the voice devices. Simultaneous transmission of the various packets can be limited to predetermined quantities, typically by utilizing a CAC (Client Access Control). Secure firewalls are also included as well as a performance test client application that provides a defined workload generated across the WAN interface for capacity planning measurements and allows remote monitoring of the QoS (Quality of Service) data, such as latency, jitter, lost packets and MOS scores. Optionally, a simple, common remote management interface is included, allowing service providers to configure, upgrade and manage the system. Additionally, address fields can be provided to voice, video or data devices attached to a LAN port. VPN authentication and encrypted sessions can be tunneled through the firewall for access to an internal network by using a VPN terminator. For power outages and other emergency purposes, additional ports that connect to PSTN (Public Switched Telephone Network) analog telephone lines as well as other analog telephones or devices, can be provided. Another advantageous element is that most of the above components or features may be enabled or disabled.

1 Claim, 18 Drawing Sheets

U.S. PATENT DOCUMENTS

| | | | |
|---|---|---|---|
| 6,822,957 B1* | 11/2004 | Schuster et al. | 370/389 |
| 7,099,674 B2* | 8/2006 | Diao et al. | 455/453 |
| 2002/0186683 A1* | 12/2002 | Buck et al. | 370/352 |
| 2003/0033418 A1* | 2/2003 | Young et al. | 709/230 |
| 2004/0022237 A1* | 2/2004 | Elliott et al. | 370/356 |
| 2004/0114577 A1* | 6/2004 | Sojka et al. | 370/352 |

* cited by examiner

FIG. 1: Traditional network

Prior Art

FIG. 2: Multimedia Access Network Device (MAND)

FIG. 3: Full Network-in-a-Box Configuration

FIG. 4: Application Layer Gateway only Configuration

FIG. 5: MAND Packet Flow

FIG. 6: ALG Process

FIG. 7: IP phone Registration

FIG. 8: Parsing SDP to Create RTP Ports

FIG. 9: Forwarding RTP Packets

FIG. 10: CAC Call Limiting

FIG. 11: Firewall Traversal

FIG. 12: DHCP Server Process

FIG. 13: VPN Process

FIG. 14: Lifeline/911 Gateway

FIG. 15: MAND LAN Configuration

FIG. 16: IP Phone Auto-Registration

FIG. 17: MAND Management

METHOD AND SYSTEM FOR IMPLEMENTING AND MANAGING A MULTIMEDIA ACCESS NETWORK DEVICE

RELATED APPLICATION

This application is related to and claims priority from the U.S. Provisional Application No. 60/328,217 titled, "Method of Implementing and Managing a Multimedia Network Access Device," filed on Oct. 10, 2001.

FIELD OF THE INVENTION

This invention relates generally to network devices. More particularly, it relates to a Multimedia Access Network Device (MAND), a complete customer premise solution that enables secure, reliable and manageable delivery of voice, video and data services over common IP connections. The MAND offers a simple, remotely manageable CPE solution for service providers offering hosted Voice-over-IP (VoIP) or other multimedia services.

BACKGROUND OF THE INVENTION

Many network devices are typically required to support multimedia and data networks. Configuring and managing these separate network devices to support traditional and multimedia traffic, including VoIP, is a very complex task. In a typical prior art network system, each and every device must be configured and managed in order for each to "hand-shake" or be compatible with each other. These activities obviously require tremendous amounts of time and skilled resources. The mix of voice, video and data services creates substantial complexity in routers, DHCP (Dynamic Host Control Protocol), NAT (Network Address Translation) and proxy devices, secure firewalls and QoS (Quality of Service), at the expense of ease-of-use. There is a great need in the art for a complete network-in-a-box solution to address these problems—an invention which facilitates voice, video and data communication by combining the above features. The novel aspects of the present invention address the unique problems encountered by prior art networks which deliver real-time multimedia and data services such as VoIP over public IP networks.

Below is a brief discussion of seven different components in a typical prior art network and the respective solutions offered by the present invention: (1) Firewall Proxy, (2) Network Address Translation (NAT) or Masquerading Proxy, (3) Call Agent Proxy/Application Layer Gateway (ALG), (4) Quality of Service (QoS), (5) Remote Management and Other Services, (6) QoS and Performance Test Client, and (7) Lifeline, 911 Gateway.

(1) Firewall Proxy—A firewall is required at the customer premise to protect against attacks from the public network. However, firewalls typically block traffic, including VoIP calls, that are not originated from inside the firewall. Holes can be poked in the firewall allowing particular ports or port ranges to be opened. However, the RTP (Real-time Transport Protocol) streams used to carry voice traffic can use a wide range of UDP (User Datagram Protocol) ports, which if opened, could increase security risks. The MAND implements a proxy to manage security for voice traffic and limit dynamic port ranges.

(2) Network Address Translation (NAT) or Masquerading Proxy—Without NAT or masquerading, every IP phone on a company network would require a unique public IP address. Because of a shortage of public addresses, this is often not practical. NAT allows many private IP addresses to be mapped to a single public address. However, another feature of NAT typically used for security, is that devices behind NAT are hidden and not directly addressable from the public network. This is a problem for IP phone devices that need to accept calls from the public network. The MAND implements a call agent proxy to map the common public address to unique private addresses.

(3) Call Agent Proxy/Application Layer Gateway (ALG)—The ALG function provides dynamic VoIP and media port management. The ALG parses each H.323, SIP or MGCP signaling packet and dynamically creates, opens and closes UDP ports to carry Real-time Transport Protocol (RTP) or Real-time Transport Control Protocol (RTCP) media packets providing end-to-end media communications. The ALG manages media transmissions, translating and delivering media packets to the private UDP ports.

(4) Quality of Service (QoS)—Real time communications traffic such as VoIP is very sensitive to congestion, latency and jitter. When voice and data traffic travel over a common IP network, data traffic such as file transfers can congest constrained WAN links causing significant degradation of voice quality.

There are several QoS mechanisms that can be used to prioritize real-time voice traffic over data traffic. Ethernet or IP packets can be tagged using 802.1p, IP-ToS, IP Precedence or Diffserv, and then prioritized in switches and routers. However, these mechanisms are not practical in many cases because of limited deployment and lack of policy management to control how packets are tagged. Queuing schemes can be implemented in customer premise routers to prioritize outbound traffic, but more commonly the congestion problem is from web downloads and other inbound traffic. Throwing out packets at the router does not prevent a narrow WAN link from being congested from traffic coming into the link from the Internet.

In order to solve these problems, the MAND supports traffic shaping in addition to tagging and queuing mechanisms. The MAND at the customer premise running traffic shaping can prioritize outbound traffic as well as free up inbound bandwidth for higher priority voice traffic. This is done by forcing the lower priority inbound data traffic to back-off so that it does not congest the WAN link.

Another problem with VoIP is that if the number of calls exceed the bandwidth of the communication link, all calls degrade. The MAND provides Client Access Control (CAC) that restricts the number of simultaneous calls to a configured number.

(5) Remote Management and Other Services—Without the MAND, a customer typically would need to purchase, configure and manage several different network devices including a router with NAT, DHCP server, firewall, VoIP proxy and traffic shaper. Configuring all of these devices to work together and managing them for mission critical voice applications is a complex task, particularly for small and medium businesses. Service providers offering outsourced VoIP services to these businesses also would have a very limited ability to assist the customer with these devices, or to identify problems by segmenting customer from network equipment while isolating problem network components.

In addition to Firewall/NAT proxy services and traffic shaping, the MAND can be configured to act as an IP router, a NAT/Masquerading server, ALG, a DHCP (Dynamic Host Configuration Protocol) server, and a firewall. The MAND can provide all of these services in a single device with a simplified common management interface. In addition, the MAND provides a remote management interface that allows a service provider to remotely configure, manage, diagnose, isolate faults, monitor performance and upgrade the device for the customer.

The MAND also supports IP voice device plug and play. IP voice devices can issue a broadcast message to discover the MAND to request configuration information.

The MAND also provides virtual private network termination with optional packet encryption. VPN technology provides a secure connection between the MAND and a service provider or another VPN termination device. The present MAND embodiment uses hardware accelerator circuits for real-time packet encryption.

(6) Performance Test Client—Service providers offering outsourced VoIP services need a way to determine the Quality of Service (QoS) that can be delivered to customers over Internet connections and troubleshoot QoS and performance problems. Most VoIP client devices have limited ability to report QoS and performance information. The MAND implements a performance test client application that allows remote monitoring of the QoS that can be delivered to the customer premise.

(7) Lifeline, 911 Gateway—With VoIP services, if there is a power outage at the customer facility and the data network devices and phones are not connected to a UPS (Uninterruptible Power Supply), the customer can lose voice services. In addition, if users dial 911 from a VoIP phone, the ANI (Automatic Number Identification) must be sent to the PSAP (Public Safety Answering Point) so the 911 service can identify the location of the caller. To address these issues, the MAND can be configured with FXO (Foreign Exchange Office) ports that connect to PSTN analog phone lines as well as FXS (Foreign Exchange Station) ports that can be connected to analog telephones or devices.

SUMMARY OF THE INVENTION

A glossary of terminologies frequently used herein is set forth in Appendix A hereto. To address the deficiencies of the prior art, the present invention provides methods and systems for a complete network-in-a-box solution. The present invention supports a wide range of network services and can replace many traditional network devices, such as: Call Agent Proxy/Application Layer Gateway (ALG) for MGCP, SIP and H.323; Packet Traffic Shaper; Client Access Control Server (CAC); Firewall; NAT/Masquerading Server; Router; and DHCP Server. The invention also provides a simple, common remote management interface allowing service providers to configure, monitor, troubleshoot, upgrade and manage the system.

In one embodiment of the invention broadly described herein, packets such as voice, video and data packets, are transmitted over common network connections, such as a LAN or WAN. The packets are mapped from a public address field (such as an IP address) and port number to a private address field and port number, the mapping process typically being handled by a NAT (Network Address Translation). The packets are also prioritized, by marking the packets for priority queuing and routing, and configuring the bandwidths of the WAN traffic and the voice traffic to predetermined quantities and configuring the address fields of the voice devices. The embodiment also limits the simultaneous transmission of the various packets to predetermined quantities, typically by utilizing a CAC (Client Access Control). Secure firewalls are also included in the MAND.

The MAND typically includes a performance test client application which provides media workload definition and traffic generation for capacity planning and allows remote monitoring of the QoS (Quality of Service) data, such as latency, jitter, lost packets and MOS scores.

Optionally, the invention also provides a simple, common remote management interface allowing service providers to configure, monitor, troubleshoot, upgrade and manage the system. Troubleshooting includes session packet capture and analysis. Troubleshooting also includes segmentation of network and premises equipment to isolate faults. With these capabilities, the MAND serves as the point of demarcation for mixed media communications.

Additionally, the invention can provide address fields to voice, video or data devices attached to a LAN port. VPN and/or encrypted sessions can be tunneled through the firewall for access to an internal network by using a VPN and/or encryption terminator. The invention can also be configured with FXO (Foreign Exchange Office) ports that connect to PSTN (Public Switched Telephone Network) analog phone lines for emergency or call routing purposes as well as FXS (Foreign Exchange Station) ports that can be connected to analog telephones, fax or other devices. The invention can also be equipped with one or more T1, E1 or DSL termination interfaces. Another advantageous element of the invention is that the above components or features may be enabled or disabled at the user's option.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variations within the scope of the appended claims. In the drawings.

DETAILED DESCRIPTION OF THE PREFERRED EMBODIMENTS

Figure 1:
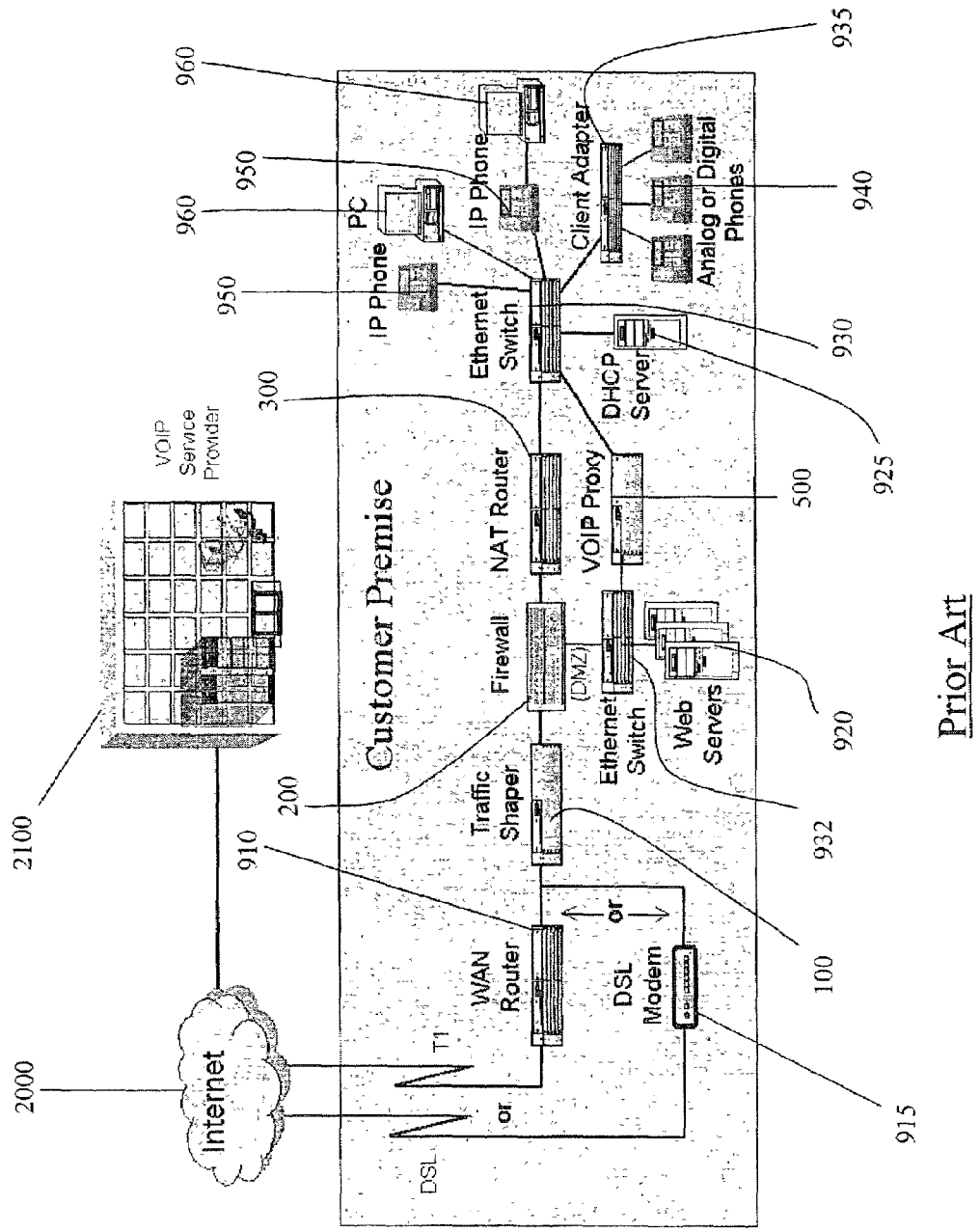
FIG. 1 shows an exemplary network system without the MAND.

As noted previously, many network devices are typically required to support a multimedia and data network. FIG. 1 shows a typical data and multimedia network system including the various network devices. As shown in FIG. 1, a typical prior art network includes devices such as a WAN router 910 or DSL modem 915, traffic shaper 100, firewall 200 with optional VPN and encryption endpoints, Web servers 920, NAT (Network Address Translation) router 300, VoIP proxy 500, DHCP (Dynamic Host Control Protocol) server 400, IP phones 950, PCs 960, client adapters 935 and analog or digital phones 940. Configuring and managing these separate network devices to support traditional and multimedia traffic, including VoIP, is a very difficult and complex task. Each and every device must be configured and managed in order for each to "hand-shake" or be compatible to each other. These activities obviously require tremendous amounts of time and skilled resources. The novel aspects of the present invention address the unique problems encountered by prior art networks which deliver real-time multimedia and data services such as VoIP over public IP networks.

Figure 2:
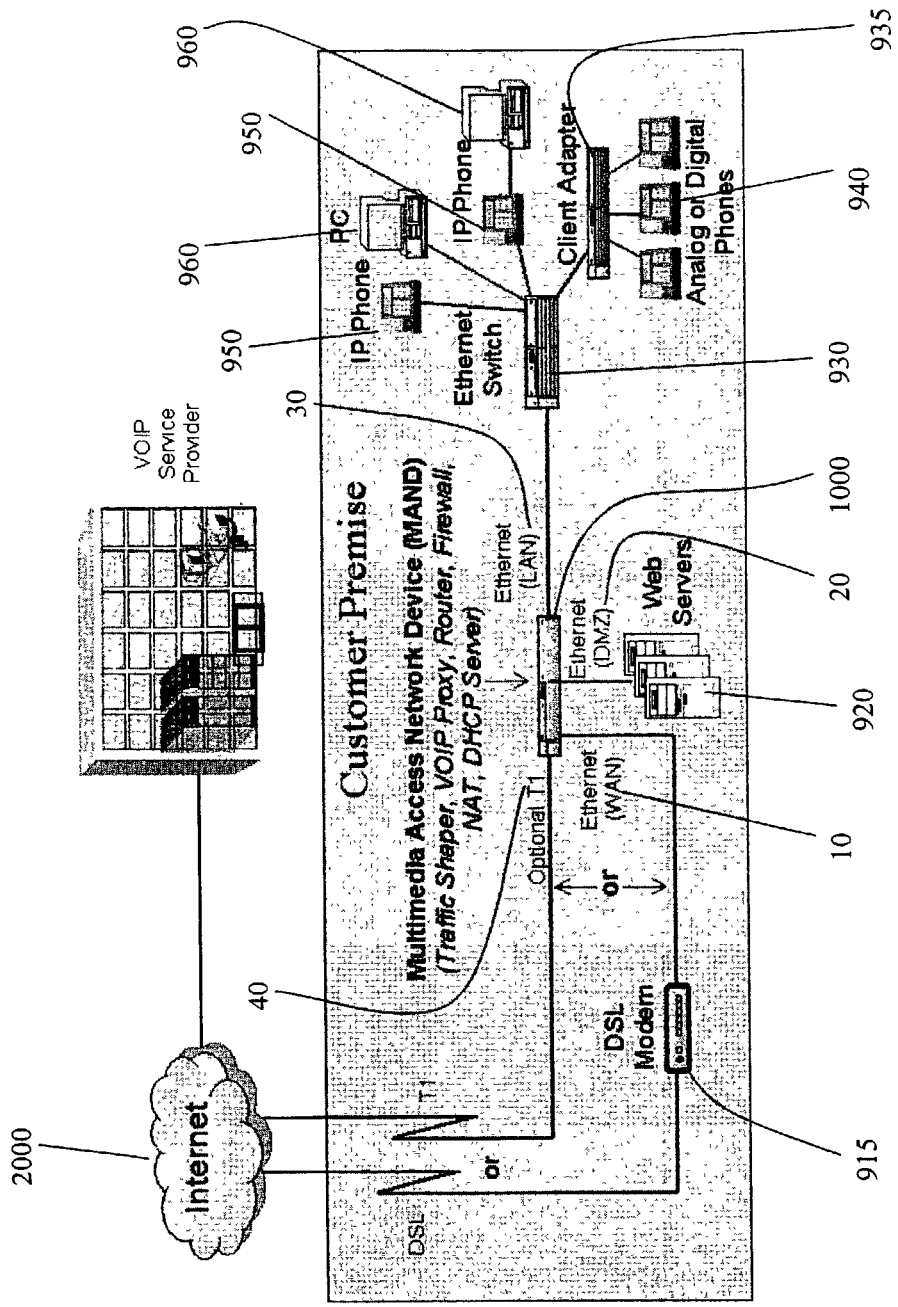
FIG. 2 shows an exemplary network system with the MAND.

FIG. 2 shows an exemplary network system replacing the various network devices with the MAND (Multimedia Access Network Device) 1000 system. As shown in FIG. 2, the MAND 1000 system includes Ethernet ports for the WAN 10, LAN 30 and DMZ 20 connections and an optional T1/E1 port 40. A DSL (or Cable) Modem 915 is connected to the Ethernet WAN port 10 of the MAND 1000. An optional T1/E1 link can be connected to the T1/E1 port 40 of the MAND. Web servers 920 or other publicly addressable servers can be attached to the DMZ port 20 of the MAND. The Ethernet LAN port 30 of the MAND is used to connect an Ethernet Switch 930 with attached computer 960 and VoIP telephone devices 950. For single phone configurations, the LAN port 30 can be connected directly to the VoIP phone 950. A computer 960 can be attached to the other Ethernet port on the phone 950. If desired, client adapters 935 such as any IP integrated access device are coupled with the Ethernet Switch 930 and the analog or digital phones 940 with the client adapter 935.

Figure 3:
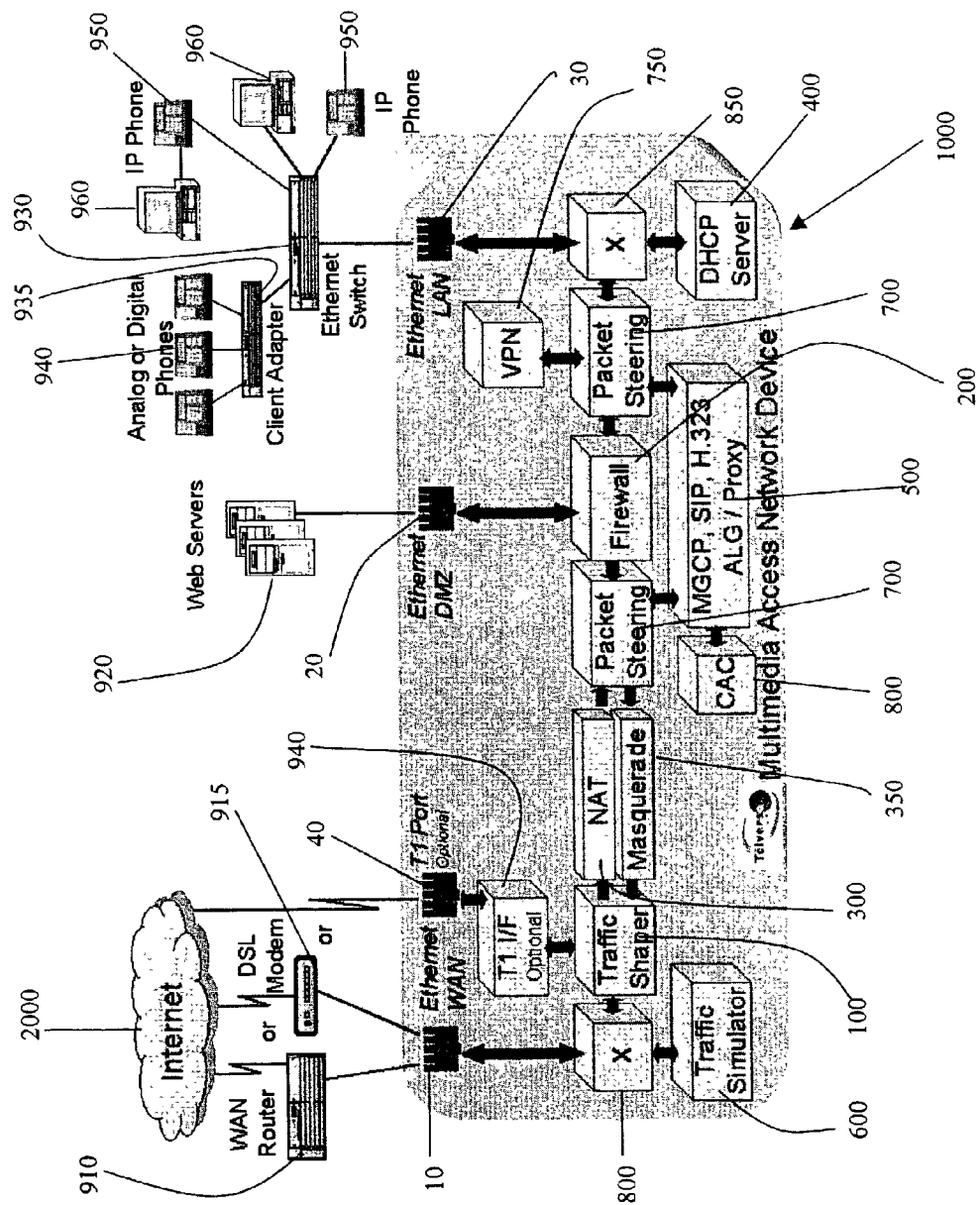
FIG. 3 shows an exemplary full network-in a box configuration using the MAND.

FIG. 3, described below, shows devices or components typically included in a complete network-in-a box MAND system. FIGS. 2 and 3 together show a preferred embodiment of the present invention, a complete customer premise network system that enables secure, reliable and manageable delivery of voice, video and data services over common IP connections. The MAND 1000 can be configured to support a wide range of network services. These services can be enabled or disabled depending on the functionality required for a particular customer application or network configuration. The features and services are described below.

A. Full Network-in-a-Box Configuration

FIGS. 2 and 3 show the MAND 1000 as a complete network-in-a-box system, consistent with the principles of the present invention.

1. WAN, DMZ and LAN Ports

As shown in FIG. 3, the Ethernet WAN port 10 connects to a DSL (or Cable) Modem 915 or T1/E1 WAN router 910. Alternatively, on the Enterprise Model 1060 (shown in FIG. 18), an optional T1/E1 card 40 can be installed to connect directly to a T1/E1 WAN link. Web servers 920 or other publicly addressable servers can be attached to the DMZ port 20. The Ethernet LAN port 30 can be connected to an Ethernet Switch 930 with attached computer 960 and VoIP telephone devices 950. For single phone configurations, the LAN port 30 can be connected directly to the VoIP phone 950. A computer 960 can be attached to the other Ethernet port on the phone 950. Additionally, client adapters 935 such as any integrated access device are connected to the Ethernet Switch 930 and the analog or digital phones 940 to the client adapter 935.

2. Traffic Shaper and Traffic Simulator

FIG. 3 shows an exemplary network system consistent with the principles of the present invention. Packets coming from the WAN 10 and LAN 30 ports first pass through the traffic shaper 100. The traffic shaper 100 can be configured to slow and "push back"-lower priority traffic coming into the WAN 10 and LAN 30 ports from the Internet 2000 to open up bandwidth for higher priority voice packets. The traffic shaper 100 is configured by setting the total available WAN bandwidth, the desired bandwidth for voice and other media traffic, and the IP addresses of the media devices, such as VoIP phones 950. The IP addresses of the voice devices can be automatically configured when the device registers with the call agent proxy 500 in the MAND 1000. Voice and media packets can also be marked at this point for priority queuing and routing. Voice packets going out the WAN port 10 can be tagged with priorities using IP-ToS, IP Precedence, or Diffserv.

The MAND 1000 includes a traffic simulation client 600 that allows remote monitoring of the Quality of Service (QoS) that can be delivered to the customer premise. This client 600 can be activated and then controlled remotely by a test application. The test application typically runs on a server at a service provider facility and collects data from the MAND and test clients. The test application can initiate VoIP as well as other data sessions between the test client 600 in the MAND and test clients placed in other parts of the network to simulate different traffic patterns. The test application can then report a variety of test results including latency, jitter, lost packets, MOS scores (representing the quality of the call that the user would hear on the phone) and other QoS or data measurements.

The MAND 1000 serves as a point of demarcation (demarc) between network and customer premises equipment. (Prior art defined the demarc as the limit of responsibility of the PSTN service provider.) Multimedia over IP networks requires a new demarc, separating network from LAN communications. Testing connectivity and QoS to the MAND WAN port 10 effectively isolates faulty communication on the WAN or on the LAN networks. Segmenting networks on the WAN and LAN sides of the MAND isolates problems to specific devices. The MAND can also be activated to capture packet streams and VoIP calls to provide analysis of jitter, packet loss and reasons for variable voice or other media quality.

3. Network Address Translation (NAT)

Figure 5:
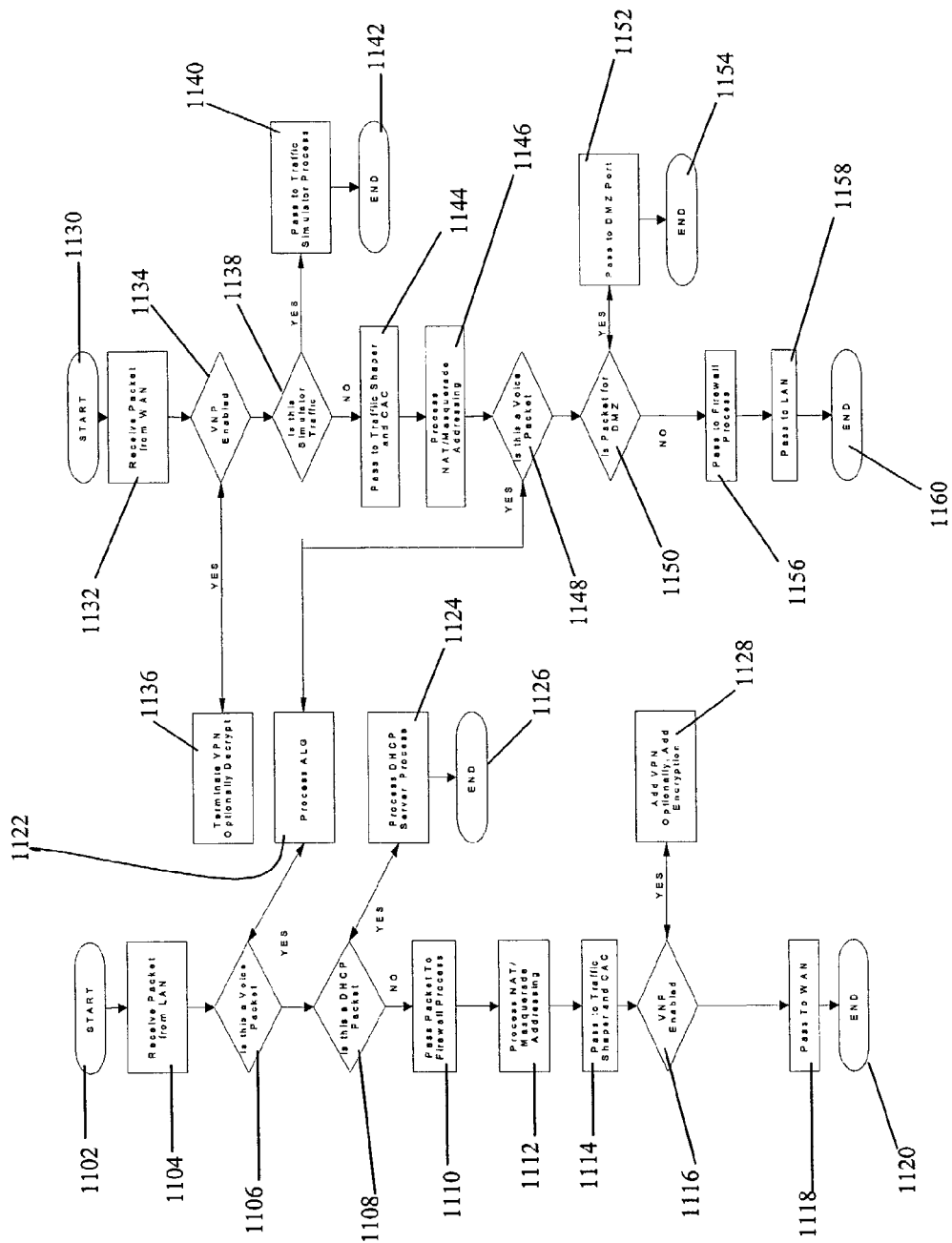
FIG. 5 shows an exemplary flowchart of a network system using the full network-in a box configuration of the MAND.

As shown in FIG. 5, after the traffic shaping process 1144, packets received from the WAN 1132 go through a NAT translation 1146 and then an application layer gateway 1122 which maps the single public IP address of the MAND 1000 and the IP port number associated with a particular session to the private address and port number of the appropriate IP phone device 950. For VoIP and other media, the MAND maps MGCP, H.323 and/or SIP signaling packets between WAN 10 and LAN 30 ports. While connecting end points with media traffic, the MAND restricts the UDP (User Datagram Protocol) port range on the public WAN 10 side to the minimum required for the number of simultaneous calls desired by dynamically creating RTP and RTCP ports when a call is initiated and recycling those ports when a call is terminated.

Dynamically created ports are typically four times the number of media sessions between end points: an RTP (Real-time Transport Protocol) port and RTCP (Real Time Conferencing Protocol) port in both directions. Each connected call creates one RTP stream for outbound data. Thus two RTP streams exist per connected call. Each RTP stream has an associated port for RTCP session control. This effectively minimizes the UDP port range that must be opened when using the VoIP aware firewall in the MAND. When using a third party external firewall a predefined range of UDP ports must remain open for use during any VoIP or other media transfer. Additional MAND firewall security is provided by dynamically creating port mappings when a communication session is initiated and destroying them when the session is terminated. In addition to VoIP devices, the NAT function 1146 can be used for standard data transfer.

4. Application Layer Gateway (ALG)/Proxy

Figure 4:
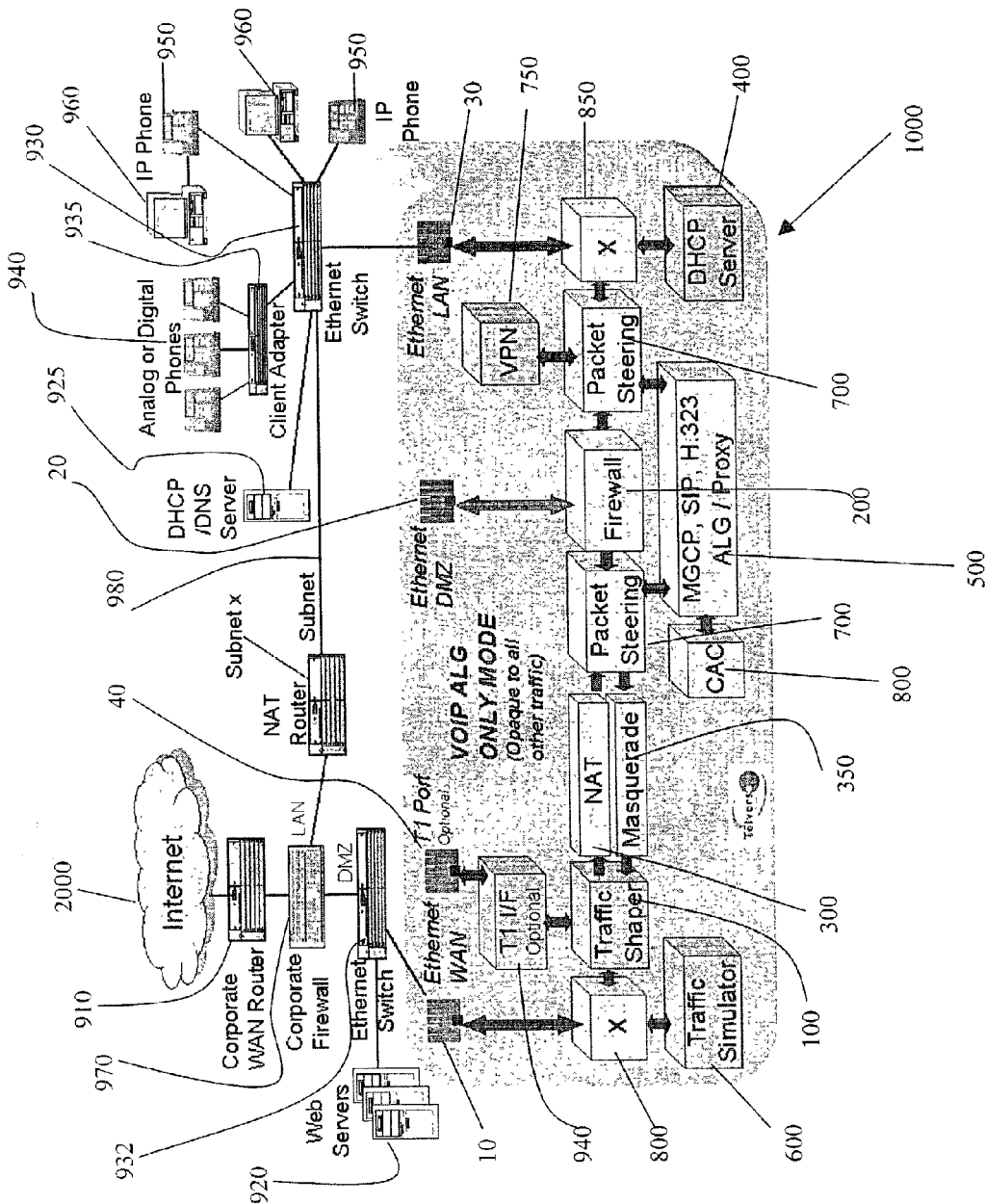
FIG. 4 shows an exemplary network using an ALG only configuration of the MAND.

Referring to FIGS. 3 and 4, the MAND 1000 contains a call control proxy/Application Layer Gateway 500 for IP voice and multimedia protocols MGCP (Media Gateway Control Protocol), SIP (Session Initiation Protocol) and H.323. VoIP phones 950 and client adapters 935 are configured to point to the MAND 1000 as the call control server 2100 of FIG. 2, proxy, gatekeeper or gateway. Typically, the IP address of the call control server 2100, proxy, gatekeeper or gateway, is programmed into the phone 950 through a menu on the phone or through FTP (File Transfer Protocol), TFTP (Trivial File Transfer Protocol) or other remote configuration mechanism. The LAN 30 IP address of the MAND 1000 is programmed into the phone 950 in place of the actual call control server, proxy, gatekeeper or gateway IP address.

As shown in FIG. 4, for users with existing high-end routers 910 and firewalls 970, the MAND 1000 can be configured as a VoIP ALG (Application Layer Gateway) 500 and proxy only by turning off all of the other features through the management interface. (Each service including QoS traffic shaping 100, ALG 500, DHCP 400, NAT 300, Firewall 200, packet capture, etc. has an enable/disable feature.) This allows all of the normal data traffic to continue to be handled by the existing network devices, and only voice or other multimedia communications traffic to be handled by the MAND. For this configuration, the MAND WAN Ethernet port 10 is connected to the DMZ port 932 on the external firewall 970. The MAND LAN Ethernet port 30 is connected to a port on the desired LAN Ethernet switch 930. The MAND can sit on one subnet and be accessed by VoIP devices on other subnets through the router 980.

Figure 7:
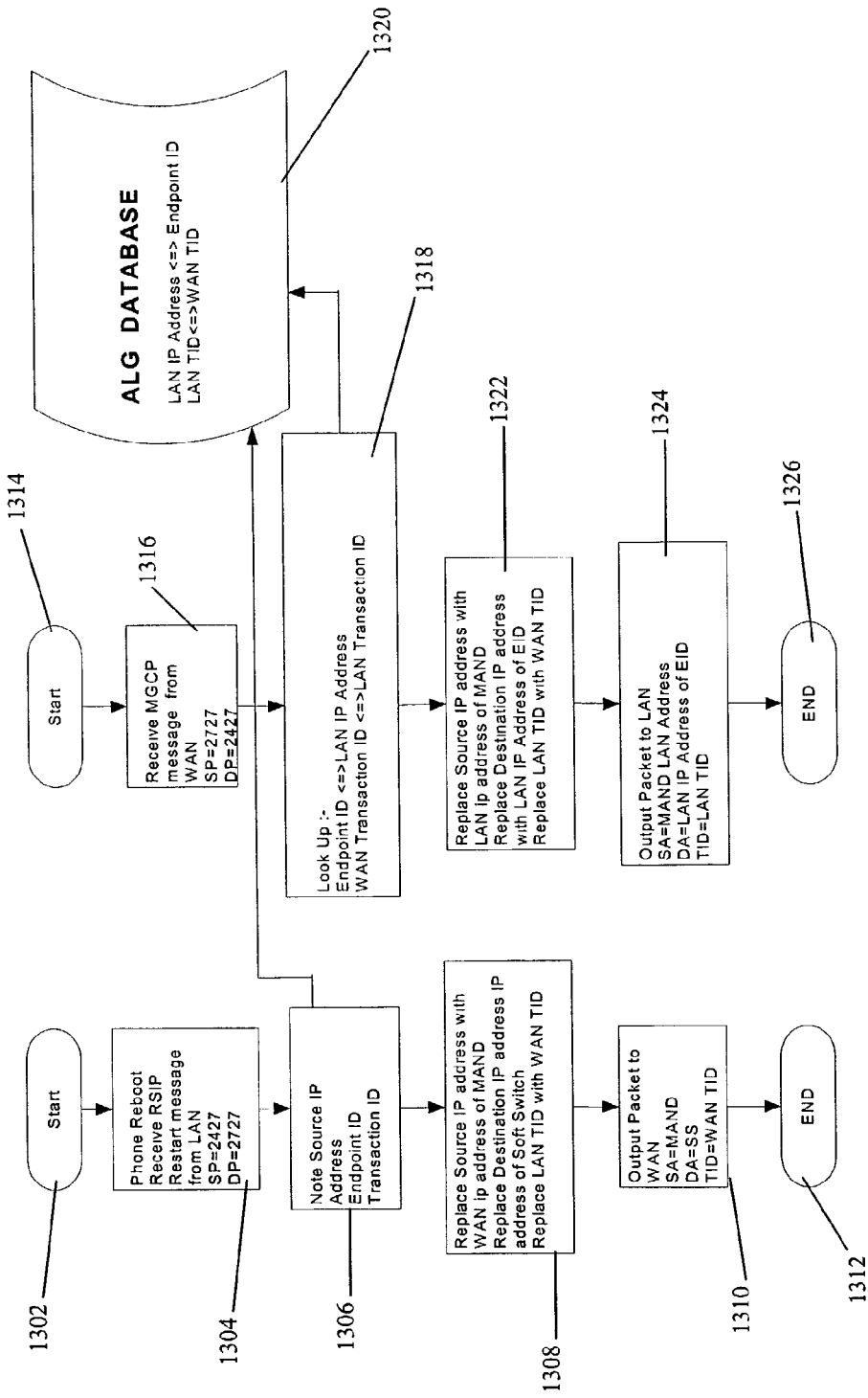
FIG. 7 shows an exemplary flowchart of a media device registering with the ALG in the MAND.

As shown in FIG. 7, the MAND registers IP phones, and represents them to the network via its single public WAN IP address 10.

Figure 6:
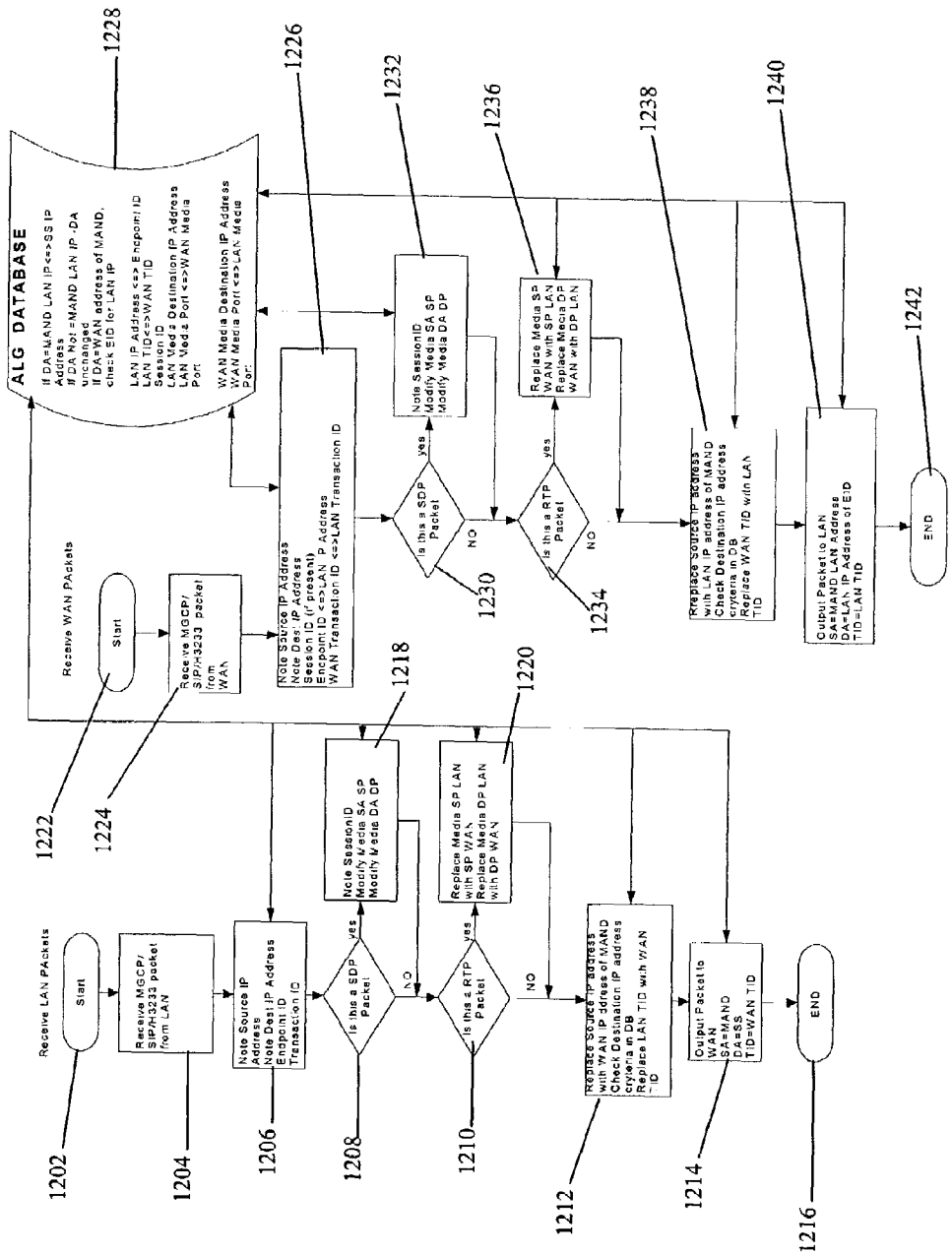
FIG. 6 shows an exemplary flowchart of a network system using the ALG only configuration of the MAND.

FIG. 6 shows an exemplary flowchart of the VoIP ALG (Application Layer Gateway). During call signaling, the MAND 1000 replaces VoIP packet private IP addresses with its public IP address and a selected UDP port number 1212. The MALG 1000 receives and dynamically establishes communication paths on these UDP ports. For SIP and MGCP, the MAND parses Session Description Protocol (SDP) signaling packets 1208 and when specified in those packets, the MAND opens and closes UDP ports 1218 to carry Real-time Transport Protocol (RTP) or Real-time Transport Control Protocol (RTCP) media packets. Subsequent RTP packets delivered to these UDP ports are relayed to the corresponding private IP address of the corresponding IP phone.

MAND processes, rewrites and forwards MGCP call signaling, SDP media signaling and RTP and RTCP media transport packets. Each of these processes is explained below.

(a) Registration

In the process of scanning packets, the mapping of IP phone addresses to host names is automatically learned and stored indefinitely by the MAND 1000 as shown in FIG. 7. If an IP phone appears with a new IP address but its original host name, the new IP address will be learned and the old IP address ignored. The MAND 1000 keeps an ALG database 1320 map of Endpoint ID of the phone and its private IP address when the phone registers with the MAND. After the registration process, the softswitch 2100 of FIG. 2 has a record of the Endpoint ID available at the WAN IP address 10 of MAND 1000, and the MAND 1000 has a Record Endpoint ID of the LAN IP 30 address of the Endpoint IP phone 950.

As Registration packets traverse the MAND 1000, the MAND 1000 replaces the Source and Destination IP address 1308 and 1322 of the packet, and the WAN or LAN Transaction ID. The source Port and Destination port, and Endpoint ID remain unchanged.

(b) MGCP, SIP and H.323 Messages

The MAND 1000 also manages the mappings between private IP address and UDP/TCP (User Datagram Protocol/Transmission Control Protocol) ports and their corresponding UDP/TCP ports on the MAND WAN IP address 10. MGCP, SIP, and H.323 messages are modified when necessary, by the NAT 300 and masquerading 350 function.

As shown in FIG. 5, in a preferred embodiment of the present invention, the MAND accepts packets on its LAN 1104 or WAN 1132 IP address using static LAN and WAN UDP ports. The MAND inspects and steers all packets, such that outbound VoIP packets received from the LAN are steered 1106 to the ALG proxy 1122, which replaces the private VoIP phone LAN IP address within the IP header with the MAND WAN IP address. Similarly, for inbound packets received from the WAN 1132, the MAND ALG proxy 1122 replaces its own WAN IP address within the IP header with the appropriate VoIP phone LAN IP address. This address translation is needed when IP phones are using private IP addresses.

As shown in FIG. 5, the MAND receives a VoIP packet from the LAN 1104 and determines whether this media packet's destination is through the WAN port 1106. If so, then the MAND ALG 1122 assigns a new public Transaction ID (TID). The source IP phone Endpoint Name (EPN), the private TID number and the public TID are stored in the lookup table 1228 of FIG. 6. Then the private (LAN) IP address, from the source-packet address field, is replaced with the MAND public (WAN) IP address and the private TID is replaced with the public TID 1212, and the processed packet is transmitted to the WAN 1214.

As shown in FIG. 6, the MAND similarly receives a VoIP packet from the WAN 1224 and determines whether the public TID number is in the lookup table 1226. If so, the destination WAN IP address, the public destination UDP port and the public TID are replaced 1238 with the IP phone destination LAN IP address, the private destination UDP port and the private TID, respectively. Also, the source IP address and the source UDP port, from the source address field, are replaced with the MAND source LAN IP address and source UDP port. Then, the packet is transmitted to the LAN 1240.

The MAND also keeps a dynamic record of each LAN Transaction ID vs WAN Transaction ID. The MAND modifies the registration messages and forwards them to the respective control server 2100 of FIG. 2, SIP server or gatekeeper with the MAND's WAN IP address 10. In VoIP messages, the Transaction ID is modified so that it is unique on the public side of the MAND 1000. All IP address references in the message are to be replaced. If Fully Qualified Domain Names (FQDNS) are used, then they do not need to be rewritten unless they are different on the public and private side of the MAND 1000. IP or MAC addresses included in parameters such as the Endpoint ID, do not need to be changed. The MAND 1000 will also learn the mapping between the Endpoint ID and private side addresses.

For SIP messages, the MAND 1000 will inspect the default gateway, Contact, Record-route and Request URI (Uniform Request Identifier) headers and replace any private IP addresses and port references and replace them with the public address of the MAND and vice versa. These private routing fields must be hidden from public view. For example, the default gateway usually is the MAND and the MAND address can be removed from the default gateway address. The MAND 1000 will learn the phone's username and its contact address mapping.

For H.323, the MAND 1000 looks for any private TSAP (Transport Services Access Point) addresses in the RAS (Registration, Admissions, and Status), Q.931 messages and replaces them with the MAND's public address and vice versa. The MAND uses standard ASN.1 encoder/decoder to parse the H.323 message and swap LAN and WAN addresses. The MAND 1000 tracks the call session and also looks for media channel and media control channel private side TSAP addresses in the H.245 OLC messages or Q.931 messages with Fast Connect and changes them with its respective public side addresses and vice versa.

(c) SDPs and RTPs

Figure 9:
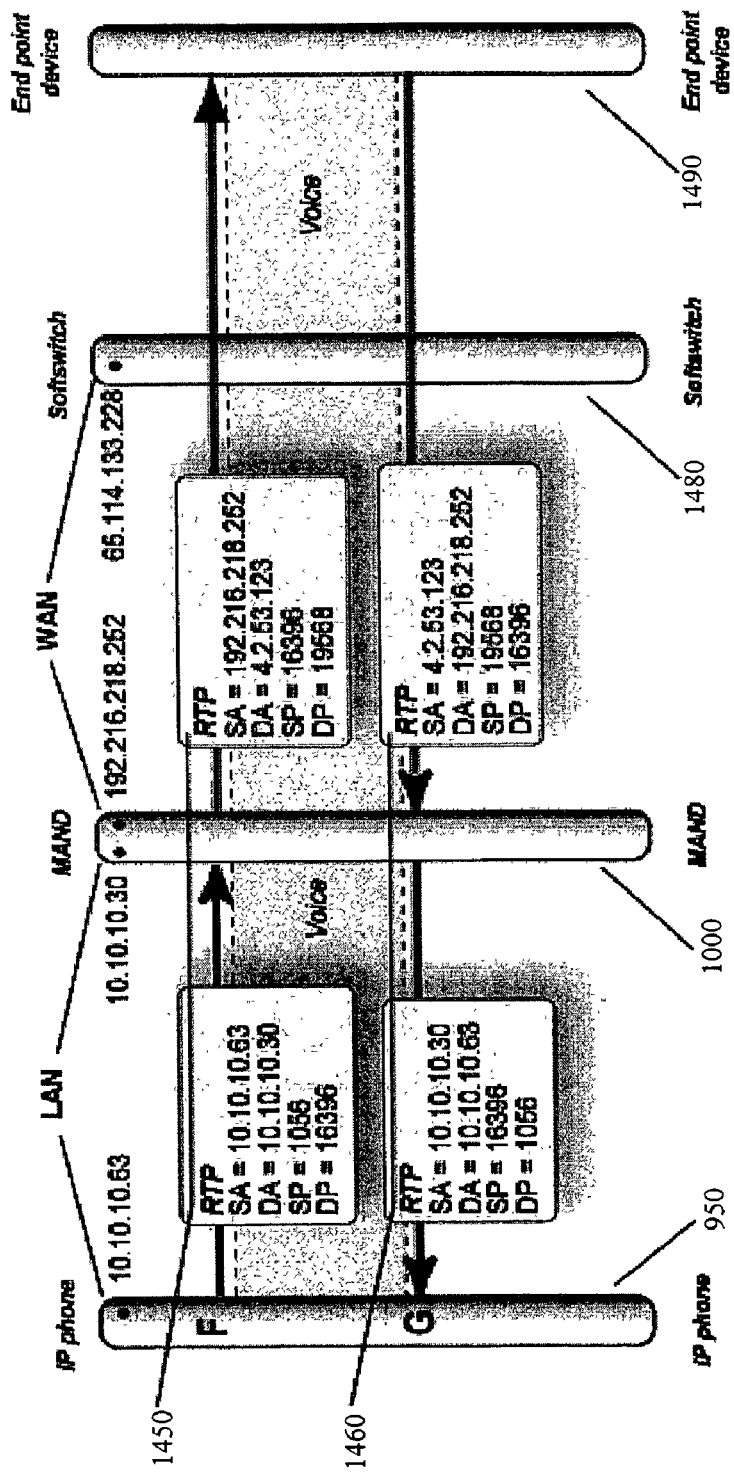
FIG. 9 shows an exemplary flowchart of a MAND ALG rewriting and forwarding RTP packets.

SDPs (Session Description Protocol) in the MGCP and SIP messages are also monitored and modified so that as connections are opened for RTP (Real-time Transport Protocol) streams, the appropriate public or private IP addresses and UDP (User Datagram Protocol) ports are used. As the MAND 1000 forwards messages from phones to the call control server 1480 of FIG. 9, SIP server or gateway, the MAND replaces the phone's private IP addresses in the SDP Connection Info field as well as the UDP port for each session in the SDP Media Description field with the MAND's public IP address and a unique public UDP port 1450.

Figure 8:
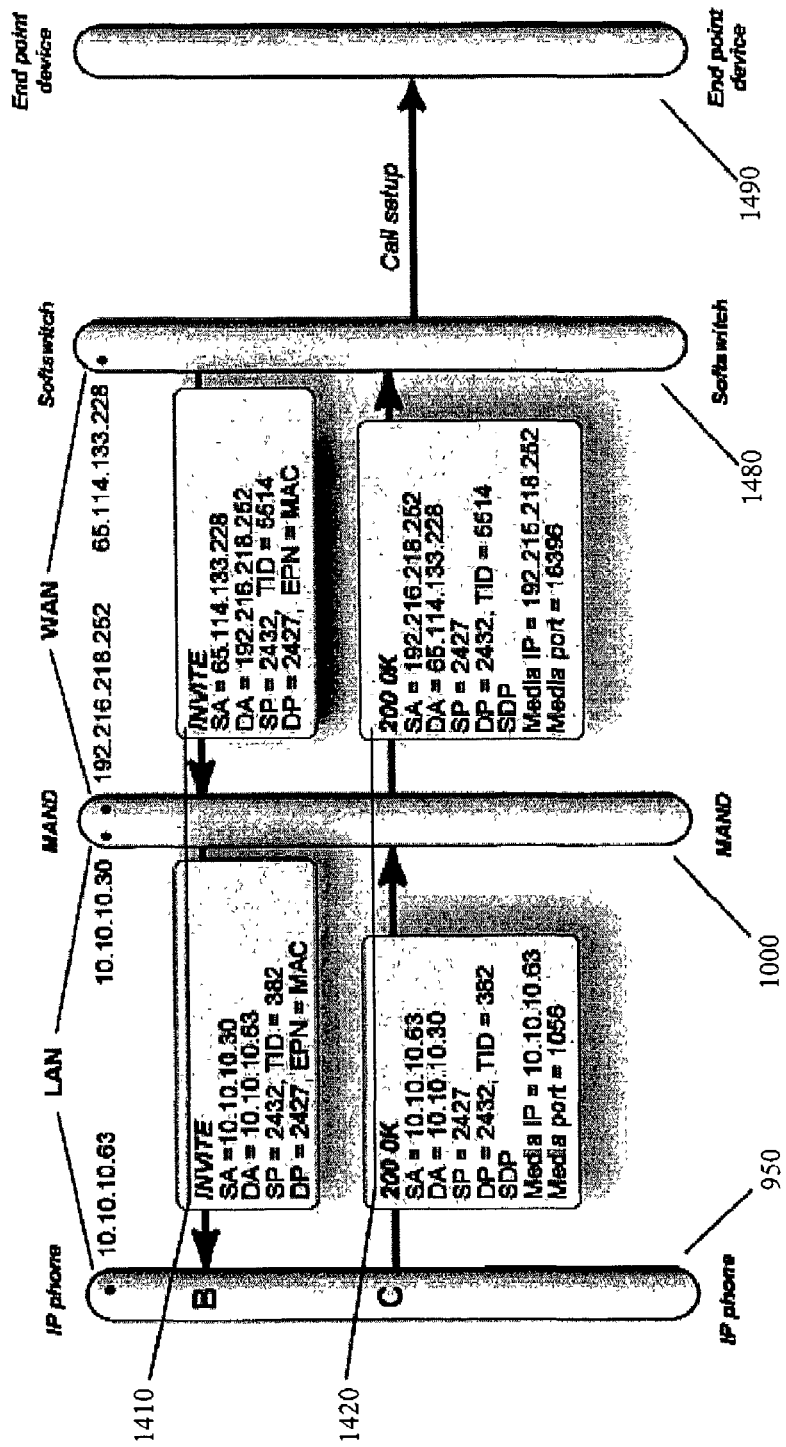
FIG. 8 shows an exemplary flowchart of a MAND ALG parsing SDP packets to create RTP UDP ports.

Every inbound and outbound VoIP packet is parsed for a Session Description Protocol (SDP) field 1420 of FIG. 8. An SDP field designates new UDP media ports for communicating RTP media. One RTP media port 1420, inbound or outbound, is contained in each SDP request. By parsing SDP fields in the VoIP packets, the MAND dynamically opens the UDP ports to start RTP communication.

For an inbound media packet with an SDP field type, the MAND opens the requested UDP port on its WAN IP address and opens a new UDP media port on the MAND LAN side, then the MAND stores the UDP port information with the destination phone IP address in the ALG database 1228 of FIG. 6 such that subsequent RTP packets will be received on the MAND WAN IP address at the requested WAN UDP port number and forwarded to the destination phone LAN IP address and new UDP port number. This inbound media packet is then forwarded to the LAN port 1240.

Similarly, the MAND 1000 replaces the public IP addresses and UDP port references in SDPs from the call control server, SIP server or gateway with the MAND private IP address and UDP ports. For initiation of sessions, the MAND will maintain an ALG database entry for the SIP session that should require the inclusion of Call-ID and tag to identify the session. To keep track of the connections for RTP forwarding, the MAND maintains a database map between private and public IP addresses and UDP ports. If, however, the call is from an IP phone 950 to another IP phone 950 on the same private network, the MAND does not modify the SDP or H.245 message to forward the RTP to the WAN interface 10. Instead, it sets up the connection so that the phones send RTPs directly to each other over the LAN interface 30.

For an outbound VoIP packet with an SDP field type, a MAND WAN UDP port number is opened and is stored with the IP phone source IP address and UDP port information in the ALG database 1228 as illustrated in FIG. 6, such that subsequent RTP packets will be received on the MAND WAN IP address 10 at the new WAN UDP port number and forwarded to the source IP phone LAN IP address 30 and UDP port number.

For each of the MAND LAN 30 and WAN 10 IP addresses, the MAND maintains a database map of corresponding IP addresses, public TID and ports that are receiving and transmitting RTP or RTCP packets and how those packets are forwarded by the opposite MAND IP address interface. This mapping is dynamic and time sensitive; i.e., the ports and IP address table must be revised and ready to transmit RTP or RTCP packets within 10 ms of receipt of each media signaling packet with an SDP field type.

The MAND 1000 can be configured with a limited range of UDP ports to use in order to limit the number of ports that must be opened in an external firewall. Typically this range should be four times the number of simultaneous calls (e.g., 2 RTP+2 RTCP ports per call).

RTP packets are forwarded to the appropriate public or private IP address and UDP port based on the database map created by the SDP or H.245 handler. The UDP/TCP packet headers for MGCP, SIP, SDP, RTP, RTCP, H.225 and H.245 are modified by the ALG 500, NAT 300 and masquerading 350 functions of FIG. 4.

5. Client Access Control (CAC)

Figure 10:
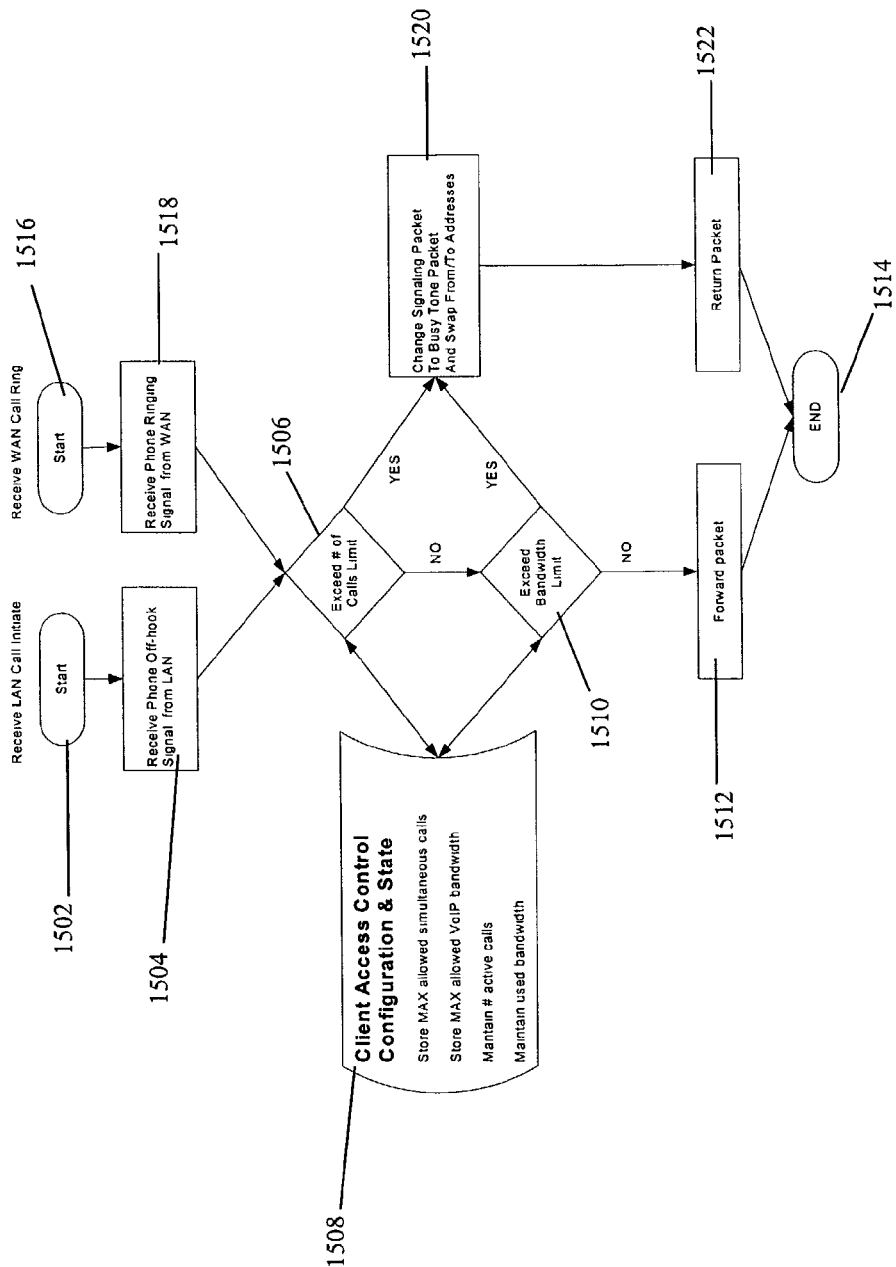
FIG. 10 shows an exemplary flowchart of a MAND performing client access control call and bandwidth limiting.

The MAND 1000 also includes a Client Access Control 800 of FIG. 4 to limit the number of simultaneous calls. Calls are rejected 1520 and 1522 of FIG. 10 once the configured limit is reached. This is similar to the call blocking or fast busy feature found on PBXs (Private Branch Exchanges) and other circuit switch devices. Without this mechanism, when the number of calls exceeds the available bandwidth, all calls will degrade.

The CAC function 800 keeps track in a configuration and state database 1508 of how much bandwidth is being used for voice calls and blocks all calls after the maximum specified bandwidth or the defined maximum number of active calls is reached. The administrator configures the maximum bandwidth allowed for voice calls and the total number of active calls allowed through the MAND management interface. These values are saved in counters in the database 1508.

Figure 14:
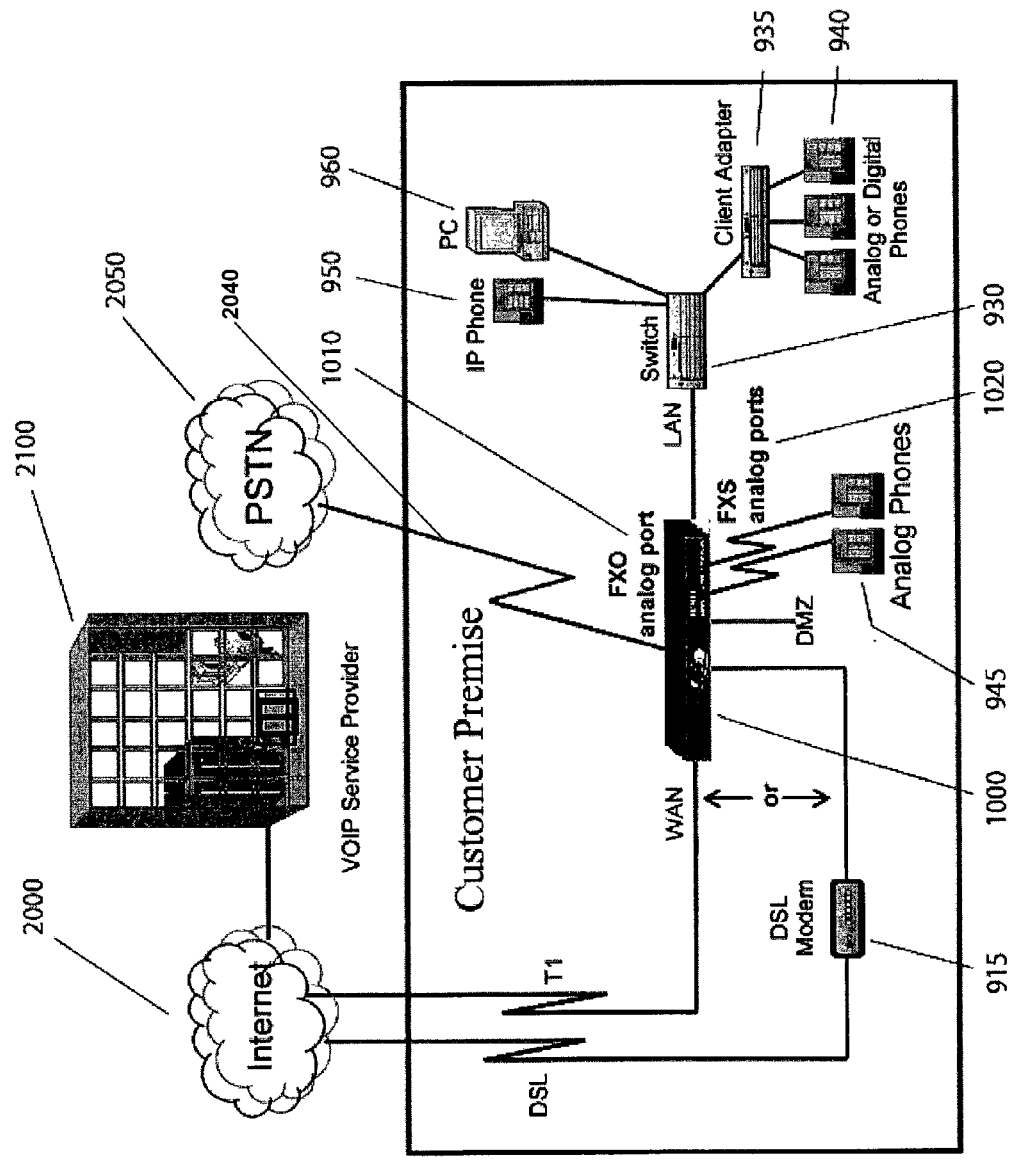
FIG. 14 shows an exemplary network with FXO and FXS ports in a MAND.

As call setup messages are received 1504 and 1518, the number of active calls is compared to the CAC active call counter 1506. If this number is exceeded then a resource unavailable message 1520 is sent 1522 to the requesting device. This is mapped into a fast busy tone and/or display message on the client device 950 or PSTN access gateway 2050 of FIG. 14.

Otherwise, the requested bandwidth is compared to the remaining bandwidth available in the CAC bandwidth counter 1510. If the bandwidth is available, the appropriate bandwidth is subtracted from the counter. This is approximately 85 Kbps for G.711 calls and 28 Kbps for G.729 calls. If the bandwidth is not available, a resource unavailable message is sent to the requesting device. This is mapped into a fast busy tone and/or display message on the client device 950 or PSTN access gateway 2050 of FIG. 14.

When a call is terminated, the number of active calls is decremented and the bandwidth used by that call is added back to the CAC counter so it can be used for other calls.

6. NTP, TFTP, FTP relay/server and Supported VoIP devices

The MAND 1000 can act as the NTP (Network Time Protocol) relay for VoIP devices to provide a common time base. The MAND also can act as a TFTP (Trivial File Transfer Protocol) or FTP (File Transfer Protocol) relay or server to download software images and provide configuration information to VoIP phones 950 or devices.

The MAND 1000 can support MGCP, SIP, and H.323 VoIP phones 950, VoIP client adapters 935 such as Cisco Systems, Carrier Access Corporation, Sylantro Systems or Zhone Technologies integrated access devices, as well as other multimedia devices using MGCP, SIP or H.323. Supported CODECs include G.711 and G.729. The MAND also supports VoIP device plug and play. VoIP devices can issue a broadcast message to discover the MAND to request configuration information. This feature requires support from the VoIP device.

7. Firewall, Router, DHCP server and VPN Terminator

Figure 11:
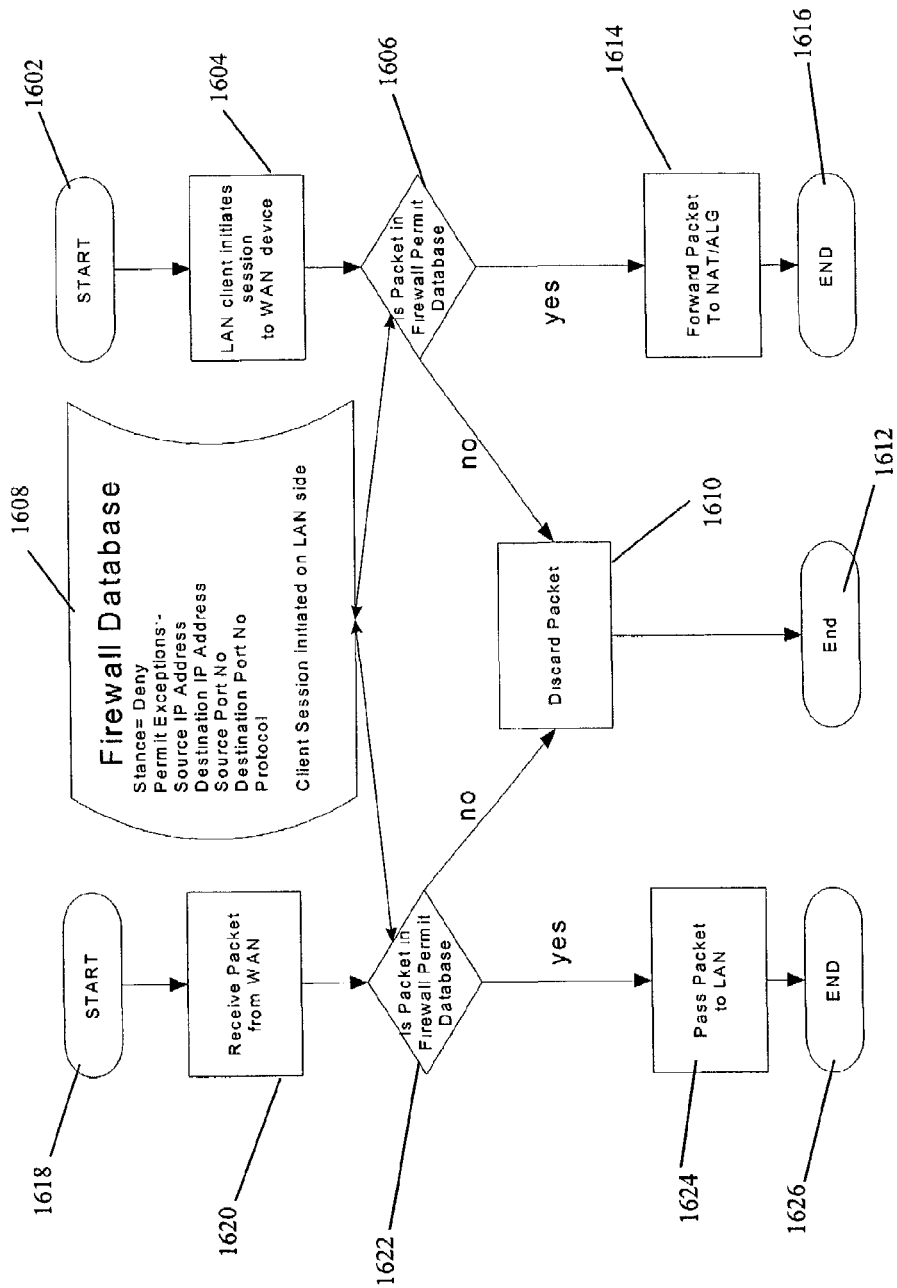
FIG. 11 shows an exemplary flowchart of a MAND performing firewall traversal on packets.

Referring to FIG. 3, the MAND 1000 includes a firewall 200 for handling voice and data traffic. Firewalls are designed to restrict IP traffic across network boundaries. Firewalls typically act on a combination of five elements: source and destination IP addresses, source and destination port numbers and IP protocol (TCP or UDP) being used. Firewall rules govern what traffic may flow across a network boundary by acting on one or more of these five elements. For each received signaling or data packet 1620 and 1604 of FIG. 11, the MAND 1000 checks all its firewall rules against the packet 1622 and 1606 and discards 1610 or forwards 1624 and 1614 the packet according to the firewall rules. For example, If only IP address 10.10.10.5 is allowed to communicate with WAN devices, then each outbound packet sent from the LAN to the WAN is inspected and only packets from 10.10.10.5 are forwarded to the MAND 1000 WAN port 10. As another example, if the MAND 1000 only forwards SIP, RTP and RTCP packets, then the MAND 1000 acts as a SIP signaling and RTP media firewall.

The firewall features in the MAND 1000 can be configured through the service provider or end user management interface. As shown in FIG. 4, if an external firewall 970 is used, the data firewall features can be set to pass or block all non-voice traffic depending on whether the MAND 1000 is placed in series or in parallel with the external firewall 970.

The MAND 1000 can also act as a basic IP router if desired. This feature can be disabled if it is not needed.

Figure 12:
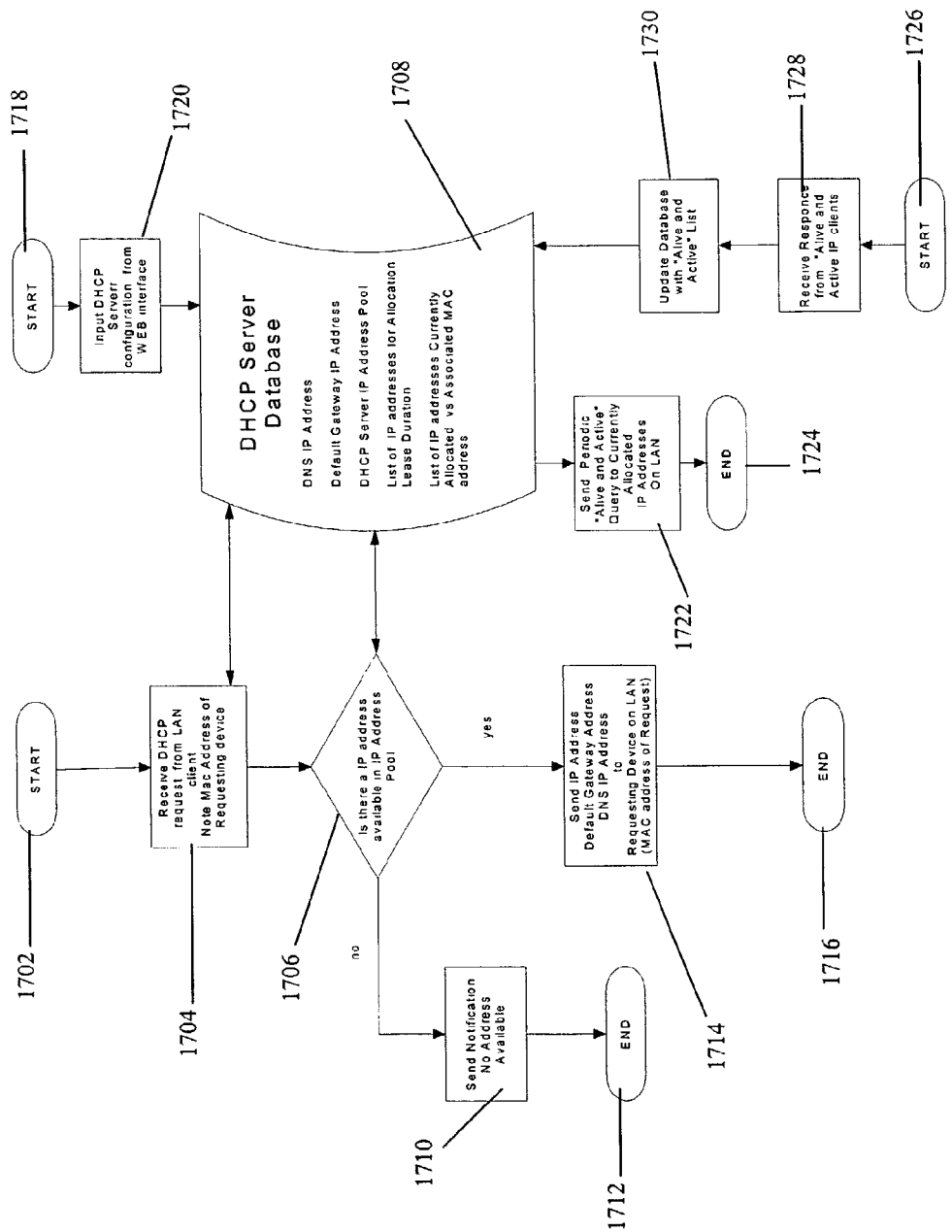
FIG. 12 shows an exemplary flowchart of a MAND with DHCP server providing IP addresses to client devices.

DHCP FIG. 12 is a TCP/IP protocol enabling workstations and network appliances to get temporary or permanent IP addresses (out of a pool) from centrally administered servers. DHCP is standardized as IETF RFC 2131. The MAND 1000 can act as a DHCP (Dynamic Host Configuration Protocol) server 400 of FIG. 4 providing IP addresses to data or voice devices attached to the LAN port 30. The user can configure blocks of IP addresses, default gateway, DNS (Domain Name Server) servers and other parameters that can be served to requesting devices. This feature can be disabled, for example if a DHCP server 925 exists elsewhere in the company network, as shown in FIG. 4.

Figure 13:
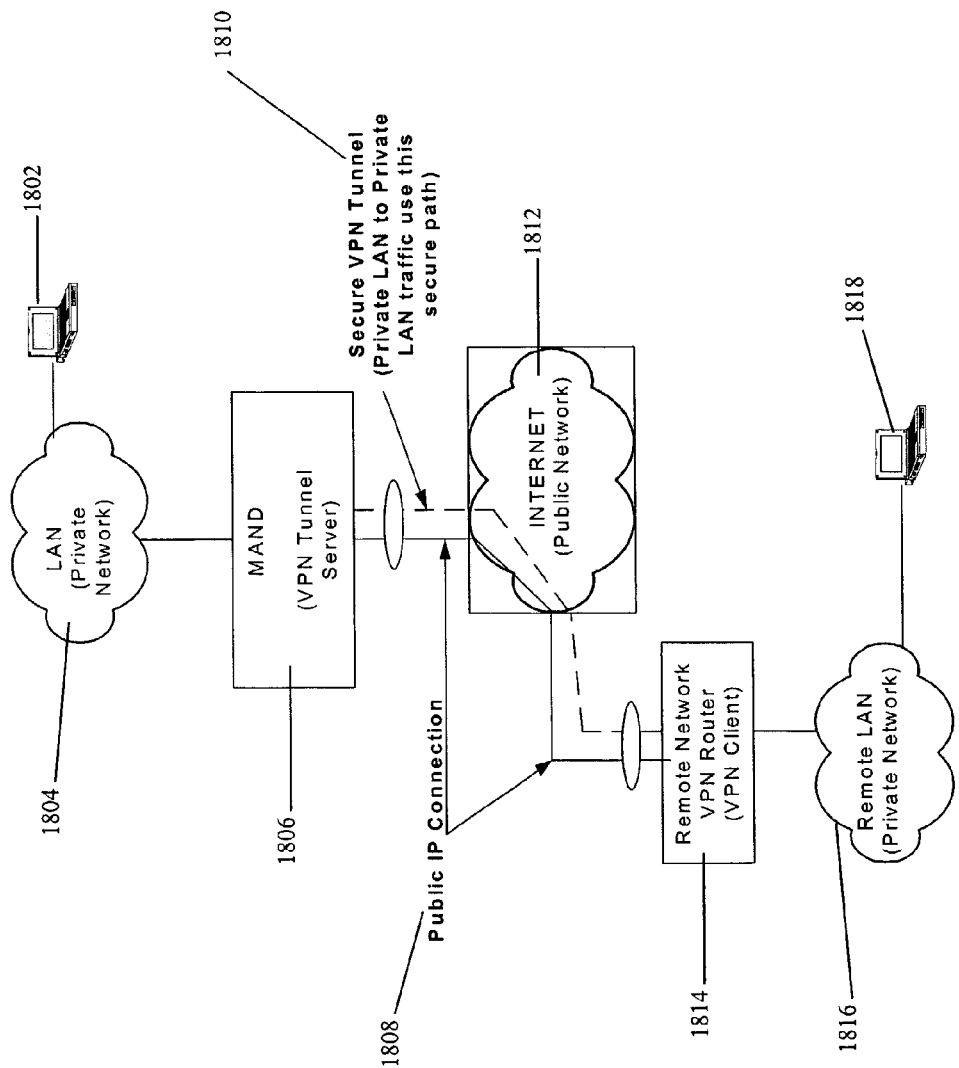
FIG. 13 shows an exemplary network using the VPN process in a MAND.

The MAND 1000 can include optional Virtual Private Network (VPN) authentication and termination shown in FIG. 13. A VPN uses the Internet as it's transport mechanism, while maintaining the security of the data on the VPN. Typically to make a VPN, it is necessary to create a secure tunnel between the two networks and route IP through it.

The VPN terminator 1806 allows the MAND to act as a VPN tunnel. This allows secure VPN sessions to tunnel through the firewall for access to the internal network. Tunnels are configured between the MAND WAN port 10 and an external VPN device such as a VPN router 1814 typically connected to a public IP network. Encryption can be supported through software or assisted with hardware depending on the configuration. Encryption technologies supported include IPsec, DES, and 3DES.

8. Lifeline/911 Gateway

With VoIP services, if there is a power outage at the customer facility and the data network devices and phones are not connected to a UPS (Uninterruptible Power Supply), the customer can lose voice services. In addition, if users dial 911 from a VoIP phone, the ANI (Automatic Number Identification) must be sent to the PSAP (Public Safety Answering Point) so the 911 service can identify the location of the caller. To address these issues, the MAND 1000 can be configured with FXO (Foreign Exchange Office) ports 1010 of FIG. 14 or a clear channel T1/E1 circuit that connects to PSTN analog phone lines 2040 as well as FXS (Foreign Exchange Station) ports 1020 that can be connected to enterprise analog telephones or devices 945.

A lifeline analog phone can be connected to the FXS port 1020 on the MAND 1000. If the power goes out or the MAND WAN port 10 loses connection with the broadband network, this phone is automatically connected to the PSTN (Public Switched Telephone Network) line on the FXO port 1010 for lifeline service. FXS ports 1020 can also be used to connect to fax machines and other analog devices. Each FXS port 1020 emulates a central office plain old telephone service presenting voltage, ringing cadence and connecting analog or digital telephones to the MAND 1000.

When a user dials 911 from an IP phone 950 or a phone connected to an IP client adapter 935, the service provider's VoIP switch can be configured to dial 911 through the FXO port 1010 on the MAND 1000 by forwarding the originating 911 call to the FXO 1010 IP address in the MAND 1000. The digital IP packet 911 call is translated to an analog call by the PSTN gateway interface embedded in the MAND 1000. Alternately, when the MAND 1000 detects the WAN port 10 broadband connection fails, then the MAND 1000 can redirect all voice packets to the FXO port 1010 as analog communication sent to the MAND PSTN gateway interface 2050. The analog PSTN line 2040 connected to the FXO port 1010 is provisioned with a 911 service and the address of the customer when ordered from the telephone company.

Also, the MAND 1000 can route calls between phones within the private enterprise on the LAN port 30 side of the MAND 1000 without signaling a WAN port 10 side softswitch. In this case the MAND 1000 acts as a private branch exchange (PBX).

9. Configuration and Management

One of the most powerful features of the MAND 1000 is the remote management interface that allows a service provider to remotely configure, manage, monitor and upgrade the system for the customer. The MAND also provides a common integrated management interface for end users for a wide range of services.

(a) Initial Configuration

The MAND 1000 supports a number of features that simplify installation at a customer site. A service provider can configure the MAND 1000 with minimal or no customer intervention. The service provider should gather the necessary configuration information from the customer when they sign up for the service. This includes the public IP address, default gateway and DNS routers that will be used by the MAND 1000, a private IP address for the LAN port 30 management interface of the MAND, a block of IP addresses for the VoIP phones 950, the number of permitted simultaneous calls to implement CAC in FIG. 10, firewall rules in FIG. 11 and other parameters. The customer can then connect and power on the MAND 1000 for immediate service while adding VoIP devices.

Figure 15:
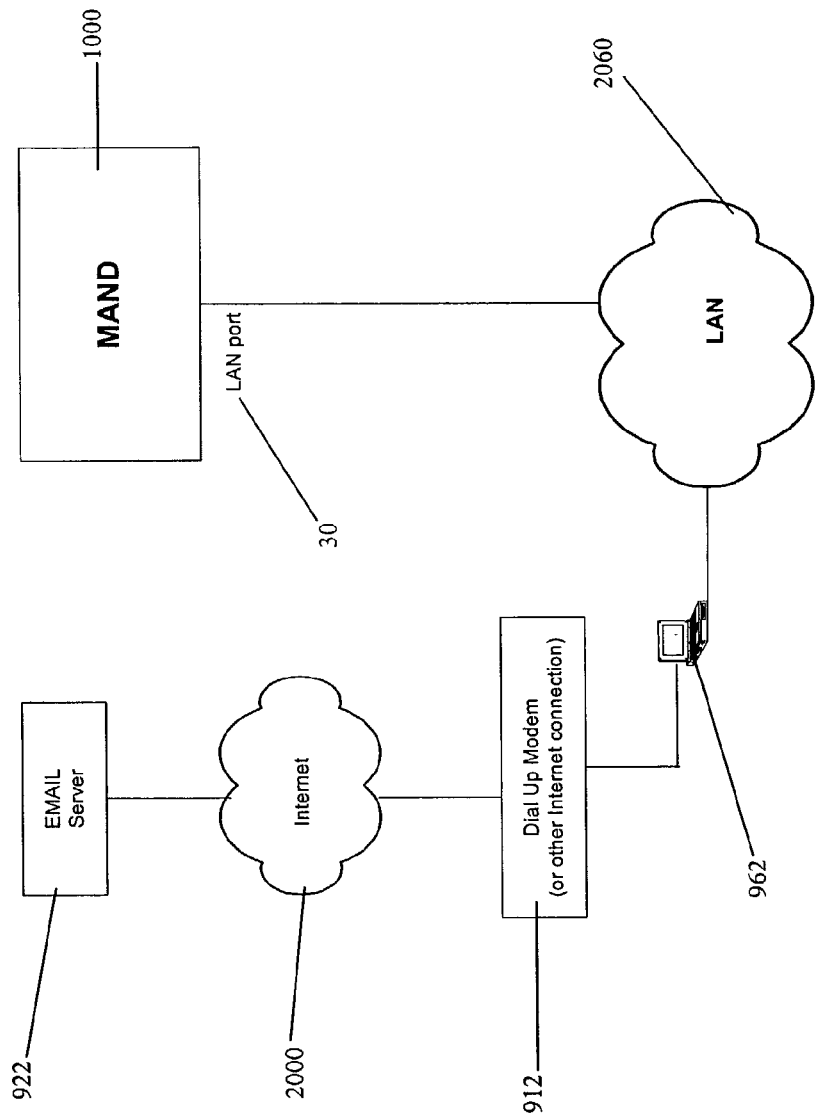
FIG. 15 shows an exemplary network with MAND configurable via the LAN port.
Figure 16:
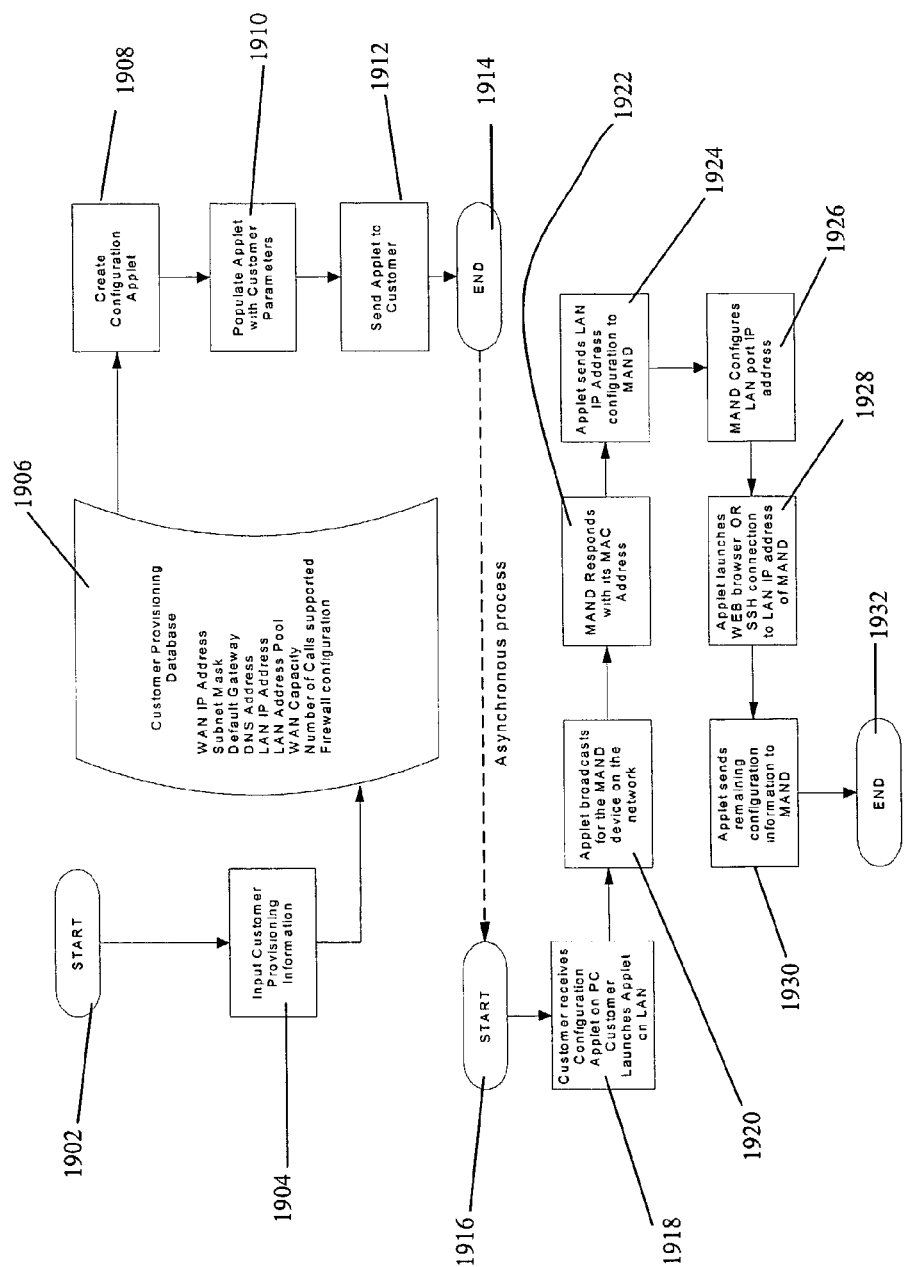
FIG. 16 shows an exemplary flowchart of a MAND registering client devices.

The MAND 1000 can be shipped to the customer without pre-configuration. In FIG. 15 (MAND LAN Configuration), the customer connects the MAND 1000 into the LAN 2060 along with a PC 962 on the same subnet with an email client 922 and web browser. The user is sent an email with a URL. When the user clicks on the URL, it launches an applet that runs a layer 2 discovery protocol in FIG. 16 to detect the MAND 1000. The MAND 1000 broadcasts Ethernet packets to all devices on its LAN port 30 side. VoIP and other media devices receive those packets and only devices recognizing the MAND 1000 broadcast replies to the MAND 1000. Those devices reply with their registration information, including URI, required QoS, request for download and other service requests.

Figure 17:
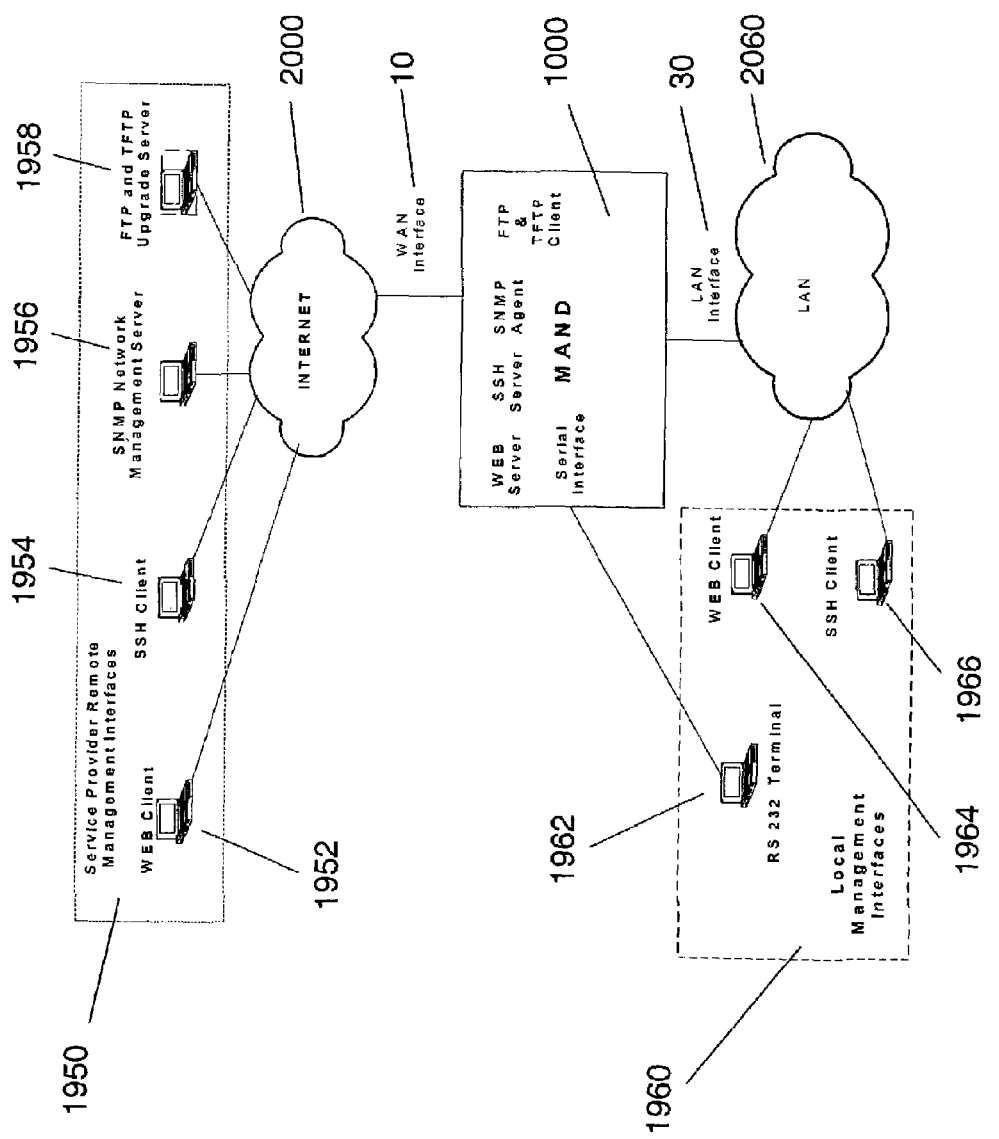
FIG. 17 shows exemplary network interfaces to manage a MAND.

The parameters necessary to begin WAN communication with the MAND 1000, including public IP address, default gateway and DNS entries, and a private IP address for the LAN management interface of the MAND 1000, are loaded from the service provider's database and configured on the MAND 1000 using the auto-discovery application. Once the MAND 1000 is configured with these parameters, it can be accessed through both its LAN port 30 and WAN port 10 management interfaces, shown in FIG. 17, for further configuration and setup.

(b) User Management Interface

The MAND 1000 provides a common integrated web based management interface that allows end users to configure a wide range of services. The user can connect to the MAND 1000 from any device on the LAN 2060 of FIG. 17 with a web browser 1964 using the private IP address assigned to the MAND 1000 during the initial configuration. When this LAN WEB connection is made, the user can enable or disable remote user management for the MAND over the WAN interface.

The end-user management interface can be restricted to block the configuration of parameters that are critical for the VoIP service, while allowing full control of data related services. Referring to FIG. 3, in the restricted mode users can configure NAT 300, DHCP 400, firewall 200, and VPN services, while the service provider has control over the traffic shaper 100, ALG/Proxy 500, traffic simulation 600 and other VoIP service related parameters.

For added security, the user management interface allows the user to disable or enable remote management of the MAND by setting passwords for SNMP 1956, VPN and/or telnet access. If disabled, and a problem occurs with the service or a firmware upgrade is needed, the user can temporarily open one of the above management access interfaces to allow LAN access or to allow the service provider to diagnose and fix the problem or download new firmware via the WAN interface.

(c) Command Line Interface

The MAND 1000 also supports a command line interface (CLI) that is similar to a Cisco IOS (Internetwork Operating System). The command line can be accessed remotely through Telnet, or locally through the serial port interface 1962 on the MAND. There are separate CLIs for the user and for the service provider.

(d) Service Provider Remote Management Interface

The WAN IP port 10 provides a management interface that can be used by a service provider to remotely configure, manage, monitor and upgrade the MAND 1000. The MAND 1000 can be configured by a remote administrator or via an automated service running at the service provider and enables a service provider to isolate and fix VoIP problems within a customers network without customer visits or customer intervention.

The MAND 1000 supports SSH 1954 for remote IP access authentication, configuration and management. For added security, SSH can be restricted to respond only to IP addresses of the service provider with a valid login and password. In addition, the user can disable the remote management interface and enable it for a particular session using the user management interface.

The MAND 1000 can be monitored by a Simple Network Management Protocol 1956 server communicating with the SNMP agent in the MAND 1000. The MAND 1000 provides standard MIB I and MIB II objects as well as custom extension MIB objects. Any authenticated management system can GET, SET and receive responses and TRAP packets from the MAND 1000 SNMP agent. SNMP can be limited to respond to only IP addresses of the service provider with a valid login and password or by community string access passwords. The user can disable the remote management interface including this feature and enable it for a particular session using the user management interface.

(e) Remote Firmware Upgrade

The MAND 1000 firmware can be upgraded using a remote management interface. The MAND 1000 supports both the TFTP and FTP 1958 download protocols.

The user specifies the IP address of the FTP server where the binary file of the new code is available. When the upgrade is initiated, the binary file is transferred to the MAND 1000 using FTP transfer. When the FTP transfer is complete, the upgrade utility replaces the existing binary file, and reboots the MAND 1000. The MAND 1000 will then boot with the new code. The configuration information will be preserved. Full images as well as incremental updates can be sent to the MAND 1000. The Rack Mounted Enterprise Model 1060, shown in FIG. 18, can store two firmware images. This allows it to continue operating while the new image is being loaded. There may be a short outage (less than one minute) while the MAND 1060 reboots. If the new firmware load is corrupted, the MAND 1060 will default back to the prior image. The Stackable SOHO Model 1050 (shown in FIG. 19) can also be upgraded remotely, however if the SOHO MAND 1050 does not store a second active firmware, then most MAND 1000 of FIG. 3 capabilities could be disabled for several minutes during the firmware upgrade. The user can disable the remote management download interface and enable it for a particular session using the user management interface.

(f) Passwords and Authentication and Encryption

There are separate logins and password for the user and service provider. For additional security, certificates or keys could be implemented. Furthermore, communication between the service provider 2100 of FIG. 2 and MAND 1000 can be encrypted. This could be provided through a security protocol such as IPsec or a VPN connection. If the VoIP phones or devices support it, a key or certificate could be combined with the URI or line ID for improved security.

(g) Redundant Configuration

A secondary standby MAND can be configured to take over if the primary MAND 1000 goes down. In standby mode, a heartbeat is maintained between the primary and secondary MAND units. The primary keeps the secondary up to date with the same configuration, and dynamic table information. If the secondary no longer detects the heartbeat from the primary unit, it takes over the IP address of the primary unit along with all of its services.

The MAND supports standby operation for the second unit. The primary unit releases its IP address when it fails over so there is not an IP address conflict when it no longer detects a heartbeat from the secondary. The secondary becomes the new primary after fail-over.

Load balancing may also be supported by the MAND 1000 allowing multiple MANDs to operate simultaneously. In this configuration, multiple MANDs share device registration information but each MAND 1000 serves only a specific subset of devices programmed into the MAND 1000 configuration. In this mode, all active MANDs act as standby for other active MANDs. If a MAND is lost, then a particular MAND configuration file alerts another MAND to accept the registered devices.

(h) Device Management and International Support

Another useful feature of the MAND 1000 is that it enables a service provider to remotely configure and monitor client adapters 935 of FIG. 2 and IP phones 950 behind the MAND 1000. The MAND 1000 acts as a management proxy by forwarding SNMP packets, media device downloads and Telnet login.

The MAND 1000 supports international characters sets, languages, protocols and interfaces. Web presentation text may be replaced with any language files without interrupting the MAND 1000 packet handling capabilities.

B. Models/Packaging

Figure 18:
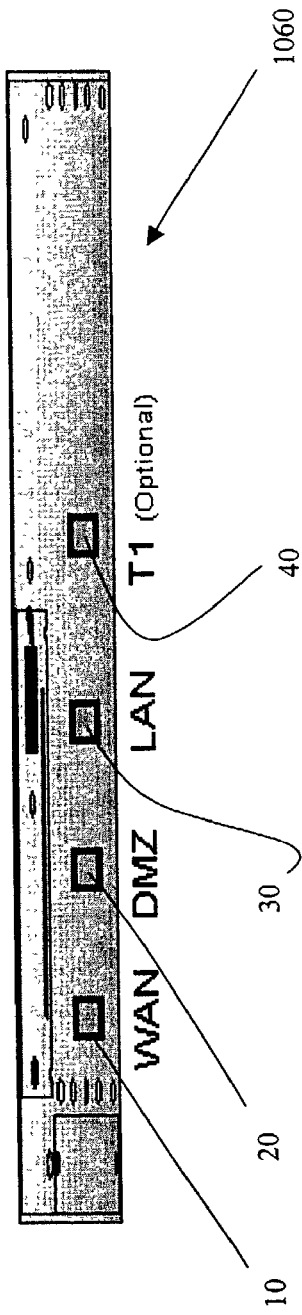
FIG. 18 shows an exemplary rack-mounted enterprise model of the MAND.
Figure 19:
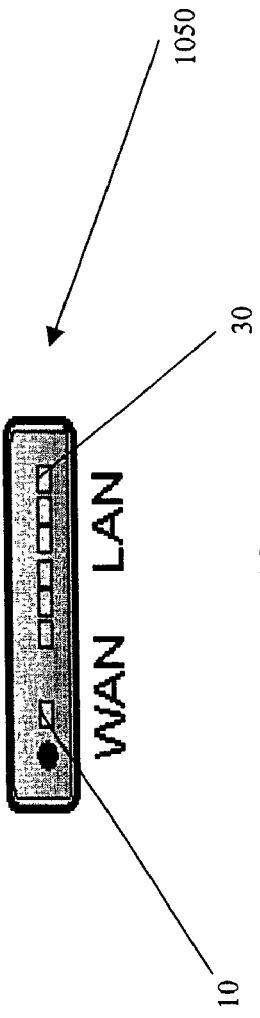
FIG. 19 shows an exemplary stackable SOHO model of the MAND.

There are two packaging embodiments of the MAND: a rack mounted enterprise model 1060 of FIG. 18 and a stackable SOHO model 1050 of FIG. 19. The Enterprise Model 1060 is designed for larger and more complex installations where additional performance and capabilities are required. This embodiment has a DMZ port 20 for connecting Web servers and other publicly addressable devices as well as an optional T1/E1 interface 40 for connecting to a wide area network connection. The Enterprise Model 1060 supports hundreds of simultaneous VoIP calls. The Stackable SOHO Model 1050 is designed for small offices and home offices where a simple, low cost device is required. This model has two Ethernet ports: a WAN port 10 that can be connected to a DSL or Cable Modem or T1/E1 WAN router, and a LAN port 30 to connect to a VoIP phone or an Ethernet switch. The SOHO model 1050 supports up to 20 simultaneous VoIP calls.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

APPENDIX A

Glossary of Terms

3DES (Triple Data Encryption Standard)—A variant of Data Encryption Standard (DES) that iterates three times with three separate keys, effectively tripling the strength of DES. 3DES is used by IPSec to encrypt and decrypt data traffic. 3DES uses a 168-bit key.

ALG (Application Layer Gateway)—ALG provides connectivity and management for network appliances such as IP phones. The ALG must first recognize and register a network appliance before it presents the appliance through its public WAN port. An ALG serves as a proxy, mapping many network appliances into one or more public IP addresses.

Broadband—A digital communication family physical transmission standards over a copper pair proposing subscriber WAN bandwidth access. Symmetric DSL provides equal up and downstream data rates. Asymmetric DSL typically provides downstream data rate at ten times the upstream rate.

CA (Client Adapter)—Is a premises hardware and software device enabling network service for analog and digital telephones by converting voice traffic into IP packets for transmission to the WAN. Each client adapter serves as an IP proxy typically from 4 up to 24 premises phones.

CAC (Client Access Control)—A CAC integer sets an upper bound for the number of simultaneous calls from the premises to a WAN. For the MAND, set the CAC integer to limit IP calls to remain within the WAN bandwidth capacity. Calls exceeding the CAC limiting integer receive a busy tone.

CLI (Command Line Interface)—A command line interface is text based prompt and reply system to configure and manage a device from a console often connected to a craft-port or COMport. Alternately, the CLI can be accessed via remote connectivity; such as telnet.

CLID—The calling line identifier (Calling Line ID) can be enabled or blocked. When enabled, the called party can view the telephone number of the calling party when the called phone is ringing.

Client—Devices and software requesting service or information from a server device are clients. An IP phone is a MAND client.

CPE (Customer Premises Equipment)—Equipment selected by and residing at the customer's premises as opposed to network (WAN) equipment.

Datagram—A transmission method in which sections of a message are transmitted in scattered order and the correct order is re-established by the receiving workstation. Datagrams are used on packet-switching networks. A datagram is the basic unit of information passed across the Internet. It contains a source and destination address along with data. Large messages are broken down into a sequence of IP datagrams.

Demarc (Demarcation)—The distinct point defining the separation of network equipment from premises equipment. The WAN side of the demarc is owned by the broadband service provider. The LAN side of the demarc contains only customer premises equipment.

DES (Data Encryption Standard)—A block-cipher algorithm for encrypting (coding) data designed by the National Bureau of Standards posing impediments for anyone without the decryption key to unscramble the data. DES uses a 56-bit key.

DHCP (Dynamic Host Configuration Protocol)—DHCP is a TCP/IP protocol enabling workstations and network appliances to get temporary or permanent IP addresses (out of a pool) from centrally administered servers. DHCP is standardized as IETF RFC 2131.

DMZ port—Demilitarized zone port allows public access to internal server/services on fixed ports without exposing the internal private network.

DNS (Domain Name Server)—Converts domain names into IP addresses.

DSL (Digital Subscriber Line)—A family physical transmission standards over a copper pair proposing subscriber WAN bandwidth access. Symmetric DSL provides equal up and downstream data rates. Asymmetric DSL typically provides downstream data rate at ten times the upstream rate.

Encapsulation—Encapsulation embeds one protocol within an outer wrapping protocol and routes the resulting packet to a destination. By unwrapping the protocol layers, the receiving device accesses packet data. In networking, encapsulation takes place by packetization or by tunneling.

Encryption—The transformation of data into a form unreadable by anyone without a secret decryption key. Its purpose is to ensure privacy by keeping the information hidden from anyone for whom it is not intended.

EPN (Endpoint Name)—A fully qualified unique domain name, such as a media access control address, commonly known as a MAC; for example, the Ethernet MAC is a unique 12 hexadecimal number uniquely identifying each Ethernet controller.

Ethernet—A local area network protocol (see IEEE 802.3) used for connecting computers, printers, workstations, terminals, servers, etc., within the same building or campus.

Firewall—A combination of hardware and software limiting exposure of premises computers to attacks from external devices.

FQDN (Fully Qualified Domain Name)—The full site name of an Internet computer system, rather than just its hostname.

FTP (File Transfer Protocol)—FTP is an extension of the TCP/IP protocol suite. FTP is an Internet protocol for accessing file archives linked to the Internet. The FTP protocol operates at layers 5 through 7 of the OSI model and typically depends upon reliable TCP connections.

Gateway—An entrance and exit into a communications network. Gateways on data networks often perform code and protocol conversion processes. According to the OSI model, a gateway is a device mapping ingress and egress across all seven layers of the OSI model.

G.711—G.711 is the international standard for encoding telephone audio on an 64 kbps channel. It is a pulse code modulation (PCM) scheme operating at a 8 kHz sample rate, with 8 bits per sample. For VoIP delivery, digital PCM voice encoding is placed in the data part of an IP packet. The resulting IP VoIP media consumes about 83 kbps of bandwidth.

G.729—ITU-T recommendation G.729 CODEC belongs to the Code-Excited Linear-Prediction coding (CELP) model speech coders and uses Conjugate-Structure Algebraic-Code-Excited Linear-Prediction (CS_ACELP) for coding speech signals at 8 kbits/sec. G.729 annex A (referred as G.729A) is the reduced complexity version of G.729 recommendation operating at 8 kbits/sec. This version is developed mainly for multimedia simultaneous voice and data applications. For VoIP delivery, digital PCM voice encoding is placed in the data part of an IP packet. The resulting IP VoIP media consumes about 26 kbps of bandwidth.

H.225—H.225 is a part of the H.323 standard. It is middleware protocol defining a message set for call signaling registration, admissions and call negotiations; i.e. synchronization.

H.245—H.245 specifies the in-band signaling protocol necessary to actually establish a call, determine capabilities and issue commands necessary to open and close media channels. The H.245 control channel is responsible for control messages governing operation of the H.323 terminal, including capability exchanges, commands and indications.

H.323—A standard from the ITU-T (International Telecommunications Union), H.323 serves as the "umbrella" for a set of standards defining real-time multimedia communications for packet-based networks; what are now called IP telephony. H.323 defines a set of call control, channel setup and codec specifications for transmitting real-time voice and video over networks not offering guaranteed quality of service, such as LAN and WAN packet-networks.

Host—A computer with serving data to other computers.

HTTP (Hypertext Transfer Protocol)—The protocol used by the Web Server and Client Browser to communicate over the internet web. The protocol used for accessing Internet web sites.

ICMP (Internet Control Message Protocol)—A network-layer protocol (RFC792) to locate and measure packet transmission rates. ICMP control messages provide feedback about network problems.

IP (Internet Protocol)—IP is the Network Layer protocol (RFC791) used in the Internet suite of protocols. IP provides:

Datagram Delivery without reliability checking
Addressing through a fixed length IP address
No method of flow control
No ordering of packets
Connectionless service
Fragmentation and reassembly of long packets An IP addressing is a 32 bit number uniquely identifying a host connected to an network and is usually represented in dotted decimal notation: 192.34.47.24.

IPsec (IP Security)—A collection of IP security measures:
Authentication Header (AH): provides authenticity guarantee for packets.
Encapsulating Security Payload (ESP): provides confidentiality guarantee for packets, by encrypting packets with encryption algorithms.
IP payload compression (IPcomp): ESP provides encryption service to the packets.
Internet Key Exchange (IKE): AH and ESP need shared secret key between peers.
For communication between distant location, IKE negotiates keys in secrecy.

LAN (Local Area Network)—A geographically localized network consisting of both hardware and software. LANs link personal computers, workstations, printers, file servers, and other peripherals.

MAC (Media Access Control) Address—An addressable device for sending and receiving packets directly on media (Ethernet, TokenRing) without using the IP protocol. MAC operates at the upper half, above link protocols, of layer two of the International Standards Organization 7 layer reference model.

MAND (Multimedia Access Network Device)—The hardware chassis and software created by Telverse Communications that enables delivery of voice, data and video over an IP network.

Mapping—In network operations, the logical association of one set of values, such as addresses on one network, with quantities or values of another set, such as devices on another network.

Masquerading server—IP Masquerading is a form of network-address translation (NAT). The masquerading server remaps outgoing packets with a real IP address and an alternate port, and remaps incoming packets with the masqueraded (private) addresses and sends them over the masqueraded (private) network to the client.

Media packet—A collection of ordered bytes, framed from initial header to final end-of-packet mark. In this context, media packets are framed as IP headers with types SIP, H.323, MGCP, RTP, RTCP, etc.

MGCP (Media Gateway Control Protocol)—Bridges PSTN and IP based networks. MGCP enables external control and management of data communications equipment operating at the edge of emerging multi-service packet networks—known as "media gateways"—by software programs, which are known as "call agents" or "media gateway controllers." Examples of media gateway devices include voice over IP gateways, voice over ATM gateways and cable modems.

MOS (Mean Opinion Scores)—A method of scoring and evaluation VoIP circuits and networks as to quality by measuring propagation delays, packetization delay, jitter-buffer delays, and data loss.

NAT (Network Address Translation)—An Internet standard that enables a local area network (LAN) to use one set of IP addresses for internal traffic and a second set of addresses for external traffic. NAT enables private to public IP address mapping.

NATP (Network Address Translation Port)—Identifies a port mapping to a premises IP address.

NTP (Network Time Protocol)—NTP was developed to maintain a common sense of "time" among the Internet hosts around the world.

OLC (Open Logical Channel) message—For each voice call, two open logical channels (OLC) are established to transfer RTP messages between phones.

OSI (Open Systems Interconnection)—Provides a network design framework to allow equipment from different vendors to be able to communicate. The OSI model organizes the communications process into seven different categories and places these categories in a layered sequence based on their relation to the user. Layers 7 through 4 deal with end-to-end communications between the message source and the message destination, while layers 3 through 1 deal with network access.

Layer 1—The Physical layer deals with the physical means of sending data over lines.

Layer 2—The Data Link layer is concerned with procedures and protocols for operating the communications lines.

Layer 3—The Network layer determines how data is transferred between computers.

Layer 4—The Transport layer defines the rules for information exchange and manages end-to-end delivery of information within and between networks, including error recovery and flow control.

Layer 5—The Session layer is concerned with dialog management.

Layer 6—The Presentation layer provides transparent communications services by masking the differences of varying data formats between dissimilar systems.

Layer 7—The Applications layer contains functions for particular applications services, such as file transfer, remote file access and virtual terminals.

Packet—Generic term for a bundle of data, usually in binary form, organized in a specific way for transmission. The three principal elements of a packet include: (1) Header—control information such as synchronizing bits, addresses of the destination and originating devices, length of packet, etc., (2) Text or payload—the data to be transmitted, (3) Trailer—end of packet, and error detection and correction bits.

Proxy—An application running on a gateway that relays packets between a trusted client and an untrusted host.

PSTN (Public Switched Telephone Network)—PSTN simply refers to the local, long distance and international phone system which we use every day.

Q.931—Q.931 is a part of the H.323 standard. It is used for call signaling, to set up a connection between two terminals.

QoS (Quality of Service)—QoS is a measure of the telephone service quality provided to a subscriber. QoS is measured by the traffic simulator by looking primarily at latency, jitter, and lost packets between the MAND and a test client.

RAS (Registration, Admissions, and Status)—RAS is a part of the H.323 standard. Q.931 is used to set up a connection between two terminals, while RAS governs registration, admission, and bandwidth functions between endpoints and gatekeepers (RAS is not used if a gatekeeper is not present).

RTP (Real-time Transport Protocol)—A standard for streaming real-time multimedia over IP in packets.

RTCP (Real-time Transport Control Protocol)—Provides real time control packets to all end points of an RTP session to negotiate services parameters between participants.

SDP (Session Description Protocol)—Used to carry payload for SIP and MGCP. SDP conference descriptors are stored in the ILS Dynamic Directory Conference Server, part of Active Directory in Windows NT 5.0. The purpose of SDP is to publicize sufficient information about a conference (time, media, and location information) to allow prospective users to participate if they so choose.

SIP (Session Initiation Protocol)—A protocol for transporting call setup, routing, authentication and other feature messages to endpoints within the IP domain, whether those messages originate from outside the IP over PSTN resources or within the IP. SIP is a text-based IP protocol for session initiation and control.

SLA (Service Level Agreement)—An agreement between a user and a service provider, defining the nature of the service provided and establishing a set of metrics to be used to measure the level of service provided measured against the agreed level of service.

SNMP (Simple Network Management Protocol)—The most common method by which network management applications can query a management agent using a supported MIB (Management Information Base). SNMP supports five message types: GET, GET NEXT, SET, GET RESPONSE and TRAP. SNMP operates at the OSI Application layer. The IP-based SNMP is the basis of most network management software.

Soft Phones—A PC or PC-type device that emulates a telephone with the prompts and commands appearing on the PC's screen, not the phone, and the PC's keyboard acting as the telephone's keys.

Subnet—A portion of an IP network sharing a common address component; i.e., sharing the same address prefix. For example, devices with IP prefixes 192.34.47 would be part of the same sub-net.

Tags—Codes used for formatting HTML documents for the World Wide Web.

TCP (Transmission Control Protocol)—Corresponds to OSI layers 4 and 5, transport and session. TCP is a transport layer, connection-oriented, end-to-end protocol. It provides reliable, sequenced, and unduplicated delivery of bites to a remote or local user.

TCP/IP (Transmission Control Protocol/Internet Protocol)—TCP/IS is a networking protocol that provides communication across interconnected networks, between computers with diverse hardware architectures and various operating systems. TCP/IP is the most complete and accepted networking protocol available. Virtually all modem operating systems offer TCP/IP support, and most large networks rely on TCP/IP for all their network traffic.

TFTP (Trivial File Transfer Protocol)—A simplified version of FTP that transfers files but does not provide password protection or user-directory capability. It is associated with the TCP/IP family of protocols. TFTP depends on the connectionless datagram delivery service, UDP.

Transaction ID—A transaction ID is a unique integer associated with each MGCP signaling request. The MAND modifies the WAN transaction ID to a unique LAN Transaction ID.

TSAP (Transport Services Access Point)—Part of the OSI layer, identifying the service access point (denoted a TCP/IP port) between the session layer and the transport layer.

Tunneling—To provide secure temporary path over the Internet, or other IP-based network, in a VPN scenario. In this context, tunneling is the process of encapsulating an encrypted data packet in an IP packet for secure transmission across an inherently insecure IP network, such as the Internet.

UDP (User Datagram Protocol)—A TCP/IP protocol describing how messages reach application programs within a destination computer. This protocol is normally bundled with IP-layer software. UDP is a transport layer, providing a (potentially unreliable, unsequenced, and/or duplicated) datagram mode of communication for delivery of packets to a remote or local user.

UDP/TCP Ports—Ports are used by the Transport Control Protocol (TCP) and User Data Protocol (UDP) to name the ends of logical connections which carry long-term associations.

URI (Uniform Resource Identifier)—is a compact string of characters identifying an abstract or physical resource. One URI subset is URL (uniform resource locator) commonly used by web browsers to identify a hosted web page. Each network appliance has URI address mapped to an IP address and, in the case of an IP phone, is also mapped to a direct inward dial telephone number.

VoIP (Voice over IP)—The technology used to transmit voice conversations over a data network using the Internet Protocol.

VPN (Virtual Private Network)—A private communications network that uses a private network (other than the PSTN) as its WAN backbone.

WAN (Wide Area Network)—A network for voice, video and data traffic external to a premises. Typically a WAN connects various premises to metropolitan and backhaul networks.

WWW (World Wide Web)—A hypertext-based system for finding and accessing resources on the Internet network.

We claim:

1. A method for processing at least one session initiation protocol (SIP) or H.323 packet over a network, comprising the steps of: receiving said at least one SIP or H.323 packet; and mapping said at least one SIP or H.323 packet from a public internet protocol (IP) address field to a private IP address field and a public transaction identification (TID) number to a private port TID number using an application layer gateway (ALG) database;

wherein said mapping step comprises the steps of: receiving said at least one SIP or H.323 packet from a wide area network (WAN) comprising said public IP address field; storing said public IP address field and said public TID number in said ALG database and assigning said private TID number and inserting said private TID number into said ALG database; determining whether said public TID number and said mapped private TID number and said mapped private IP address field exists in said ALG database, wherein if said public TID number or said mapped private TID number or said mapped private IP address field does not exist in said ALG database, then said at least one SIP or H.323 packet is dropped; and wherein if said public TID number or said mapped private TID number or said mapped private IP address field does exist in said ALG database, then replacing said public IP address field with said private IP address field and replacing said public TID number with said private TID number, and transmitting said at least one SIP or H.323 packet to a local area network (LAN) comprising said private IP address field.

* * * * *